United States Patent
Nishi et al.

(10) Patent No.: US 10,652,566 B2
(45) Date of Patent: *May 12, 2020

(54) IMAGE CODING METHOD, IMAGE DECODING METHOD, MEMORY MANAGING METHOD, IMAGE CODING APPARATUS, IMAGE DECODING APPARATUS, MEMORY MANAGING APPARATUS, AND IMAGE CODING AND DECODING APPARATUS

(71) Applicant: Sun Patent Trust, New York, NY (US)

(72) Inventors: Takahiro Nishi, Nara (JP); Youji Shibahara, Tokyo (JP); Hisao Sasai, Osaka (JP); Toshiyasu Sugio, Osaka (JP)

(73) Assignee: Sun Patent Trust, New York, NY (US)

( * ) Notice: Subject to any disclaimer, the term of this patent is extended or adjusted under 35 U.S.C. 154(b) by 6 days.

This patent is subject to a terminal disclaimer.

(21) Appl. No.: 15/972,377

(22) Filed: May 7, 2018

(65) Prior Publication Data
US 2018/0255314 A1    Sep. 6, 2018

Related U.S. Application Data

(63) Continuation of application No. 15/386,327, filed on Dec. 21, 2016, now Pat. No. 10,021,410, which is a
(Continued)

(51) Int. Cl.
H04N 7/12      (2006.01)
H04N 11/02    (2006.01)
(Continued)

(52) U.S. Cl.
CPC .......... *H04N 19/50* (2014.11); *H04N 19/172* (2014.11); *H04N 19/174* (2014.11);
(Continued)

(58) Field of Classification Search
None
See application file for complete search history.

(56) References Cited

U.S. PATENT DOCUMENTS 5,400,075 A    3/1995   Savatier
7,742,523 B2   6/2010   Schlockermann et al.
(Continued)

FOREIGN PATENT DOCUMENTS

CN    1097088       1/1995
CN    101895748    11/2010
(Continued)

OTHER PUBLICATIONS

Office Action dated Nov. 5, 2018 for the corresponding European Patent Application No. 16 190 165.7.
(Continued)

*Primary Examiner* — Chikaodili E Anyikire
(74) *Attorney, Agent, or Firm* — Wenderoth, Lind & Ponack, L.L.P.

(57) ABSTRACT

With an image coding method which allows reduction of processing loads, when pictures included in a video signal are classified into layers so as to belong to their respective layers, a picture that belongs to the second layer that is located in a range restricted according to the first layer to which a current picture to be coded that is one of the pictures belongs, is referred to as a reference picture for the current picture, and the current picture is coded based on the reference picture.

4 Claims, 31 Drawing Sheets

Related U.S. Application Data continuation of application No. 13/349,174, filed on Jan. 12, 2012, now Pat. No. 9,584,818.

(60) Provisional application No. 61/437,145, filed on Jan. 28, 2011, provisional application No. 61/432,683, filed on Jan. 14, 2011.

(51) Int. Cl.

| | | |
|---|---|---|
| *H04N 11/04* | (2006.01) | |
| *H04N 19/50* | (2014.01) | |
| *H04N 19/31* | (2014.01) | |
| *H04N 19/423* | (2014.01) | |
| *H04N 19/172* | (2014.01) | |
| *H04N 19/174* | (2014.01) | |
| *H04N 19/187* | (2014.01) | |
| *H04N 19/44* | (2014.01) | |

(52) U.S. Cl.
CPC ........... *H04N 19/187* (2014.11); *H04N 19/31* (2014.11); *H04N 19/423* (2014.11); *H04N 19/44* (2014.11)

(56) References Cited

U.S. PATENT DOCUMENTS

| | | | |
|---|---|---|---|
| 7,760,803 | B2 | 7/2010 | Schlockermann et al. |
| 7,929,605 | B2 | 4/2011 | Kimata et al. |
| 8,139,637 | B2 | 3/2012 | Schlockermann et al. |
| 2004/0052507 | A1 | 3/2004 | Kondo |
| 2004/0190614 | A1 | 9/2004 | Schlockermann et al. |
| 2007/0098068 | A1 | 5/2007 | Kimata et al. |
| 2007/0183494 | A1* | 8/2007 | Hannuksela ... H04N 21/234327 375/240.1 |
| 2007/0263722 | A1 | 11/2007 | Fukuzawa |
| 2008/0062187 | A1 | 3/2008 | Schlockermann et al. |
| 2009/0067496 | A1* | 3/2009 | Ying ............ H04N 19/105 375/240.15 |
| 2010/0215093 | A1 | 8/2010 | Schlockermann et al. |
| 2012/0183059 | A1 | 7/2012 | Nishi |

FOREIGN PATENT DOCUMENTS

| | | |
|---|---|---|
| CN | 101917614 | 12/2010 |
| EP | 2 224 745 | 9/2010 |
| EP | 2 227 019 | 9/2010 |
| JP | 2004-040816 | 2/2004 |
| JP | 2004-222311 | 8/2004 |
| JP | 2007-306160 | 11/2007 |
| WO | 2005/011285 | 2/2005 |
| WO | 2007/042916 | 4/2007 |

OTHER PUBLICATIONS

H.264 and MPEG-4 Video Compression, chapter 6, H.264/MPEG4 Part 10, Ian E. Richardson, Oct. 17, 2003, XP030001626.

ITU-T, Telecommunication Standardization Sector of ITU, H.264, Series H: Audiovisual and Multimedia Systems Infrastructure of audiovisual services—Coding of moving video, "*Advanced video coding for generic audiovisual services*", Mar. 2010.

Partial International Search Report attached with PCT/ISA/206 dated Feb. 7, 2012 in corresponding International Application No. PCT/JP2012/000161.

Thomas Wiegand et al., "WD1: Working Draft 1 of High-Efficiency Video Coding", Joint Collaborative Team on Video Coding (JCT-VC) of ITU-T SG16 WP3 and ISO/IEC JTC1/SC29/WG11, JCTVC-C403, Ver. 1, $3^{rd}$ Meeting: Guangzhou, CN, Oct. 7-15, 2010.

Hideaki Kimata et al., "Temporal Scalable Video Coding with Hierarchical Reference Picture Selection Method", Electronics and Communications in Japan, Part 3, vol. 89, No. 3, pp. 397-410.

Extended European Search Report dated Feb. 26, 2016 in European Patent Application No. 12734120.4.

Heiko Schwarz et al., "Hierarchical B pictures", Joint Video Team (JVT) of ISO/IEC MPEG & ITU-T VCEG (ISO/IEC JTC1/SC29/WG11 and ITU-T SG16 Q.6), JVT-P014, 16th Meeting: Poznan, PL, Jul. 23-29, 2005, XP 030006056.

Office Action and Search Report dated Mar. 2, 2016 in Chinese Application No. 201280002258.4, with partial English translation.

Jeongyeon Lim et al., "Description of video coding technology proposal by SK telecom, Sejong Univ. and Sungkyunkwan Univ.", Joint Collaborative Team on Video Coding (JCT-VC) of ITU-T SG16 WP3 and ISO/IEC JTC1/SC29/WG11 1st Meeting: Dresden, DE, Apr. 15-23, 2010, [JCTVC-A113].

Extended European Search Report dated Jan. 17, 2017 in European Patent Application No. 16190165.7.

Matsuoka S. et al., "Coding Efficiency Improvement with Adaptive GOP Size Selection for H.264/SVC", 3rd International Conference on Innovative Computing Information and Control (ICICIC '08), 2008.

* cited by examiner

FIG. 23

| |
|---|
| Video stream (PID=0x1011 Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00 Secondary video) |
| Video stream (PID=0x1B01 Secondary video) |

FIG. 26
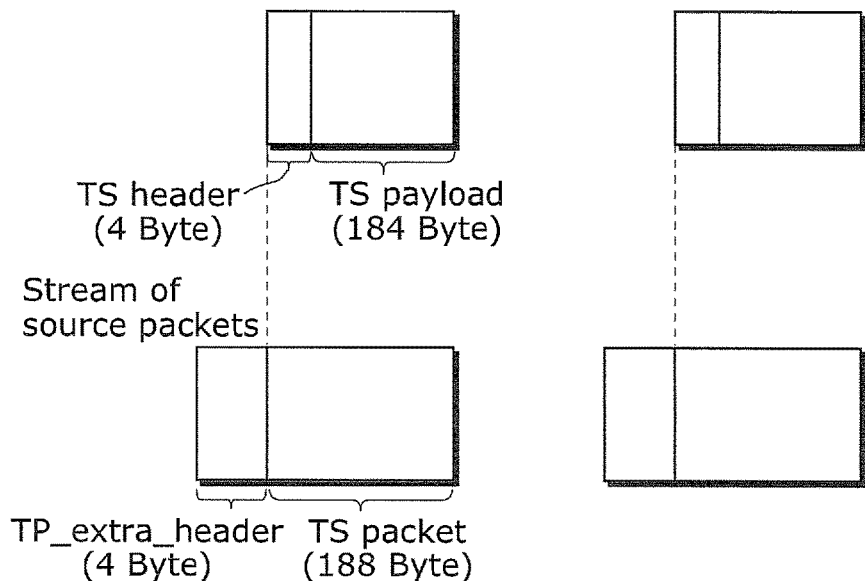
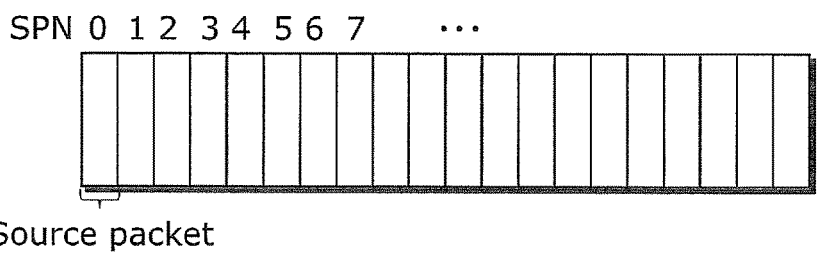
FIG. 27
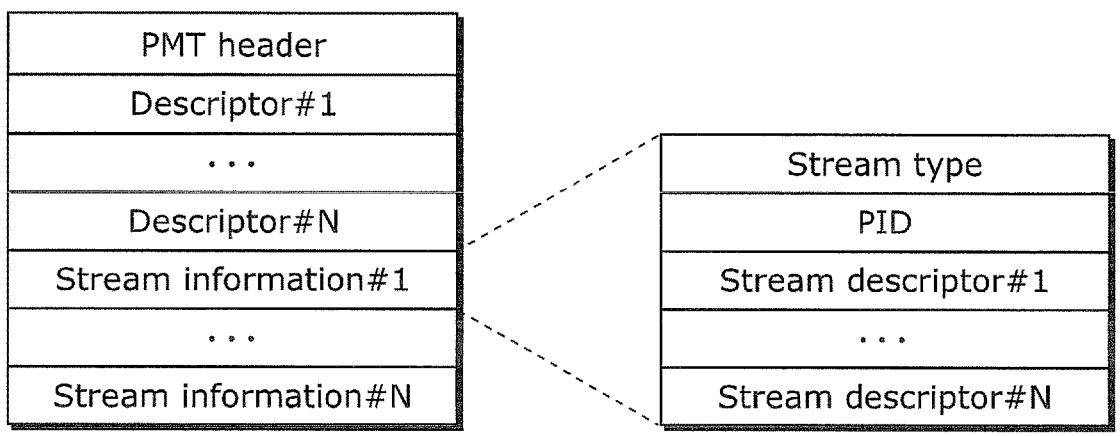

ex800

FIG. 34
| Corresponding standard | Driving frequency |
|---|---|
| MPEG4. AVC | 500MHz |
| MPEG2 | 350MHz |
| ⋮ | ⋮ |
FIG. 35A
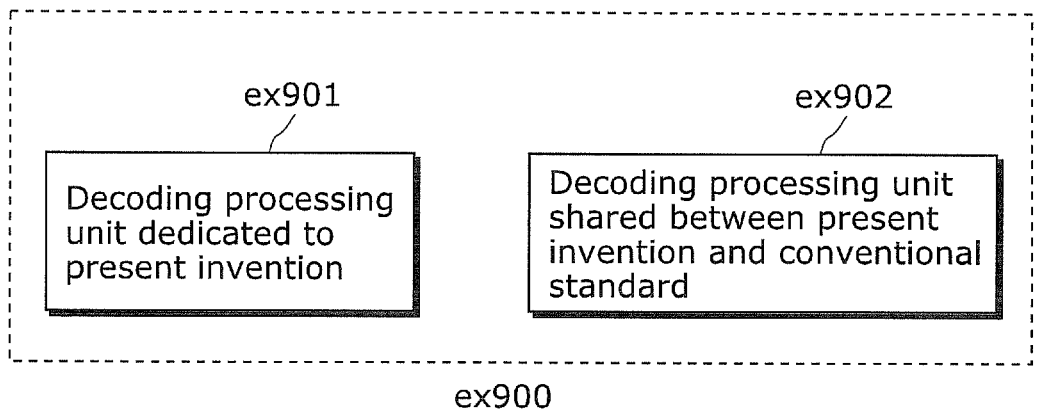
FIG. 35B
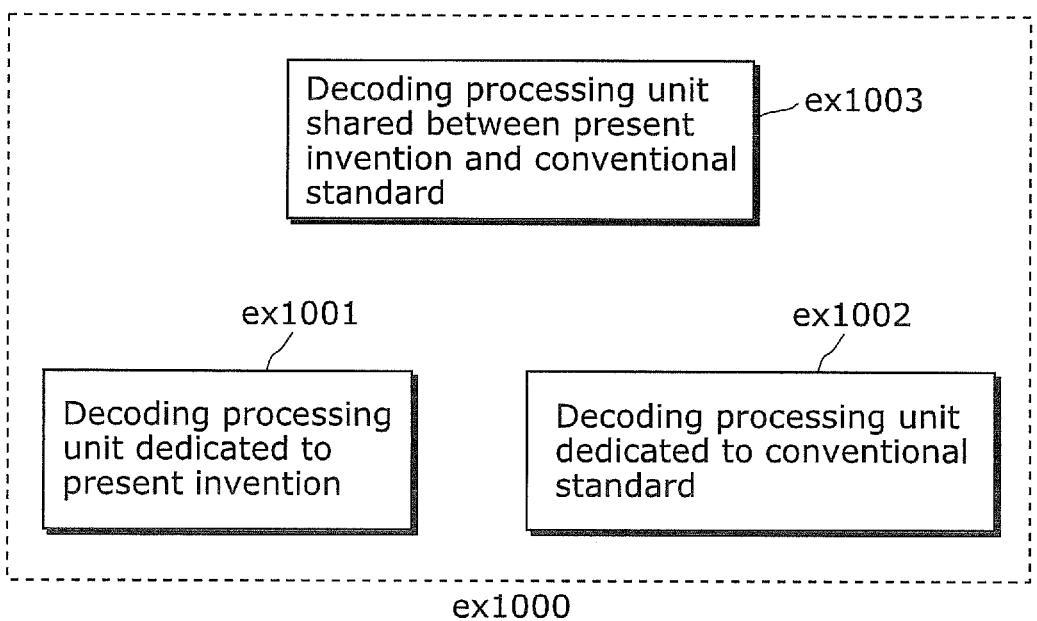

ND IMAGE CODING AND
IMAGE CODING METHOD, IMAGE DECODING METHOD, MEMORY MANAGING METHOD, IMAGE CODING APPARATUS, IMAGE DECODING APPARATUS, MEMORY MANAGING APPARATUS, AND IMAGE CODING AND DECODING APPARATUS

BACKGROUND OF THE INVENTION (1) Field of the Invention

The present invention relates to an image coding method, an image decoding method, and the like, for video.

(2) Description of the Related Art

In an image coding method for coding video, an amount of information is generally compressed using redundancy in a spatial direction and a temporal direction held by the video. In general, conversion into a frequency region is used as the method of using the redundancy in the spatial direction, and an inter picture prediction (hereinafter referred to as inter prediction) coding is used as the method of using the redundancy in the temporal direction. When a picture is coded in the inter prediction coding, a coded picture that precedes or follows a current picture to be coded in display order is used as a reference picture. A motion vector is derived by performing motion estimation on the current picture with respect to the reference picture, and a difference is calculated between image data of the current picture and a predictive picture obtained by performing the motion compensation based on the motion vector, thereby removing the redundancy in the temporal direction.

With the image coding standard called H.264 which has already been standardized, three types of pictures; that is, I-picture, B-picture, and P-picture, are used for compression of the amount of information. The I-picture is a picture on which the inter prediction coding is not performed, in other words, a picture on which intra picture prediction (hereinafter referred to as intra prediction) is performed. The P-picture is a picture on which the inter prediction coding is performed with reference to a coded picture that precedes or follows a current picture to be coded in display order. The B-picture is a picture on which the inter prediction coding is performed with reference to two coded pictures that precede or follow the current picture in display order In addition, the I-picture and the P-picture include a switching slice and the like (SI slice, SP slice) for switching between streams, and the like.

With the image coding method and the image decoding method that conform to the existing H.264 standard, these methods are required to be applicable to all of the reference relations that can be conceived by the definition of the pictures of these types. When decoding a P-picture, for example, it is required that a picture that follows in the display order is allowed to be referred to. In addition, when two motion vectors are present for the B-picture, the directions of these two motion vectors may be forward or backward. In addition, pictures which are different for each block in a slice may be referred to. In order to correspond to the flexibility of such a reference structure, execution of some processes are required for the image coding method and the image decoding method in H.264 (see, for example, Non Patent Literature 1: ITU-TH. 26403/2010).

SUMMARY OF THE INVENTION

However, with the image coding method and the image decoding method disclosed by the above-described Non Patent Literature 1, there is a problem that a processing load is high.

In view of the problem described above, an object of the present invention is to provide an image coding method and an image decoding method for allowing reducing of the processing load.

In order to achieve the object described above, an image coding method according to an aspect of the present invention is an image coding method for coding a video signal, the image coding method comprising: referring to an image as a reference image for a current image to be coded, when a plurality of images included in the video signal are classified into layers such that each of the plurality of images belongs to a corresponding one of the layers, the current image being one of the plurality of images which belongs to a first layer, and the reference image belonging to a second layer located in a range restricted according to the first layer; and coding the current image based on the reference image. According to the above-described structure, the layer to which a reference image that is referred to when coding a current image to be coded belongs is present within a range that is restricted according to the first layer to which the current image belongs. Thus, since the reference image that is referred to when coding the current image is restricted according to the first layer, it is possible to reduce the processing load of the coding. In addition, since the reference image is restricted, it is also possible, when decoding an image coded as described above, to reduce the processing load of the decoding. In addition, in the referring, it may be prohibited to refer to an image that belongs to a layer located above the first layer, and the image that belongs to the second layer may be referred to as the reference image, the second layer being located in a range restricted to the first layer or below the first layer.

According to the above-described structure, since it is prohibited to refer to an image that belongs to a layer located above the first layer to which the current image belongs, it is possible to code the current image with less processing load. Likewise, since it is not necessary, when decoding a coded image as well, to refer to an image that belongs to a layer located above a layer to which the coded image belongs, it is possible to decode the coded image with less processing load. In addition, in the case where each image included in a video signal is treated as an image to be coded and the video signal is coded, it is not necessary to refer, in decoding any image included in the coded video signal, to an image that belongs to a layer located above a layer to which the image to be coded belongs. Thus, it is only necessary for the image decoding apparatus to decode an image that belongs to a layer that is the target of special reproduction, and thus it is possible to omit the trouble of decoding and referring to an image that belongs to a layer positioned higher than the layer that is the target of special reproduction. For example, in the case where the layer that is the target of special reproduction such as N time-speed reproduction (N>2) is the lowest level layer located at the bottom, the image decoding apparatus does not have to take the trouble of decoding and referring to an image which is not the target of special reproduction, and only have to decode each of the images that belong to the lowest level layer. For example, the each of the plurality of images is a picture or a slice.

In addition, in order to achieve the object described above, an image coding method according to another aspect of the present invention is an image coding method for coding a video signal, the image coding method comprising: generating a flag indicating whether or not a restriction is to be imposed on selecting of a reference image that is referred to for coding of a current image to be coded, when a plurality of images included in the video signal are classified into layers such that each of the plurality of images belongs to a corresponding one of the layers, the current image being one of the plurality of images; selecting, as the reference image for the current image, an image that meets a condition restricted according to a first layer to which the current image belongs, when the flag indicates that the restriction is to be imposed; coding the current image with reference to the selected reference image; and including the flag into the video signal which has been coded.

According to the above-described structure, in the case where the flag indicates adding of a restriction, an image that meets the condition restricted according to the first layer to which the current image to be coded belongs is selected as a reference image. More specifically, a reference image that is referred to for coding of the current image is restricted according to the first layer. As a result, it is possible to reduce the processing load of the coding of the current image. In addition, since a flag that indicates whether or not to impose a restriction on selecting of a reference image is generated and included in a coded video signal, it is possible for the image decoding apparatus that decodes the coded video signal to easily determine whether or not a restriction is imposed on selecting of the reference image. As a result, the image decoding apparatus can properly decode the coded video signal with less processing load. In addition, in the selecting of a reference image, when a criterial image that belongs to a second layer located in a range restricted according to the first layer is located between the current image and a candidate image in coding order, it may be prohibited to select the candidate image as the reference image and an image other than the candidate image may be selected as the reference image. For example, in the selecting of a reference image, it is prohibited to select the candidate image as the reference image when the criterial image belongs to the second layer located in a range restricted below the first layer. In addition, in the selecting of a reference image, it may be prohibited to select, as the reference image, the candidate image that precedes the current image in coding order.

According to the above-described structure, it is possible to select an appropriate image as the reference image and to further reduce the processing load.

In addition, in order to achieve the object described above, an image decoding method according to an aspect of the present invention is an image decoding method for decoding a coded video signal, the image decoding method comprising: referring to an image as a reference image for a current image to be decoded, when a plurality of images included in the coded video signal are classified into layers such that each of the plurality of images belongs to a corresponding one of the layers, the current image being one of the plurality of images which belongs to a first layer, the reference image belonging to a second layer located in a range restricted according to the first layer; and decoding the current image based on the reference image. For example, the image decoding method described above further comprises generating a reference list that indicates one or more images each of which belongs to the first layer or a layer below the first layer, other than all of the images that belong to their respective layers located above the first layer, among the images included in the coded video signal, wherein in the referring to the reference image, the reference image is selected from the one or more images indicated in the reference list.

According to the above-described structure, the layer to which the reference image that is referred to for decoding of the current image to be decoded belongs is present in a range that is restricted according to the first layer to which the current image belongs. Thus, since the reference image that is referred to for decoding of the current image is restricted according to the first layer, it is possible to reduce the processing load of the decoding.

In addition, in order to achieve the object described above, an image decoding method according to another aspect of the present invention is an image decoding method for decoding a coded video signal, the image decoding method comprising: obtaining, from the coded video signal, a flag indicating whether or not a restriction is imposed on selecting of a reference image that is referred to for decoding of a current image to be decoded, when a plurality of images included in the coded video signal are classified into layers such that each of the plurality of images belongs to a corresponding one of the layers, the current image being one of the plurality of images; selecting, as the reference image for the current image, an image that meets a condition restricted according to a first layer to which the current image belongs, when the flag indicates that the restriction is to be imposed; and decoding the current image with reference to the selected reference image. According to the above-described structure, in the case where the flag indicates that a restriction is imposed, an image that meets the condition restricted according to the first layer to which the current image to be decoded belongs is selected as a reference image. To be specific, a reference image that is referred to for decoding of the current image is restricted according to the first layer. As a result, it is possible to reduce the processing load of the decoding of the current image.

In addition, in order to achieve the object described above, a memory managing method according to an aspect of the present invention is a memory management method for managing a memory in which an image that is referred to for coding or decoding a video signal is stored, the memory management method comprising storing, in a region of the memory, a target image to be stored, when a plurality of images included in the video signal are classified into layers such that each of the plurality of images belongs to a corresponding one of the layers, the region being restricted to a layer capacity that is a capacity allocated to a layer to which the target image belongs, the target image being one of the plurality of images. To be specific, the memory management method described above further comprises allocating, to each of the layers, a corresponding part of available capacity of the memory as a layer capacity.

There is a case, for example, where a long-time reference image that is referred to over a long period of time belongs to another layer, and the long-time reference image is stored in another region of a memory. In such a case, when the target image to be stored is stored in the other region, the long-time reference image might be deleted from the memory in some cases. It is therefore necessary to perform such processing as decoding of the long-time reference image again, in order to refer to the long-time reference image after the long-time reference image is deleted from the memory. In view of the above, with the memory managing method according to an aspect of the present invention, since the target image to be stored is stored in a region of a memory, which is restricted to a layer capacity that is allocated to the layer to which the target image belongs, it is possible to prevent the long-time reference image from being deleted from the memory. In other words, it is possible to store a necessary reference image in the memory without fail. As a result, it is possible to omit such a redundant process as decoding once again of the long-time reference image. In addition, it is possible to reduce the processing load for successively applying a memory management command for instructing deleting of an unnecessary image in order to store the necessary reference image in the memory without fail, for example. Here, in the storing, when the region has no remaining capacity available for storing the target image, an existing image stored earliest among one or more existing images already stored in the region may be deleted from the region, so that the target image is stored.

In addition, a layer to which a reference image belongs may be restricted to a layer same as or located below a layer to which a current image to be processed belongs, the reference image being an image to be referred to for coding or decoding of the current image among the plurality of images included in the video signal, and in the allocating of the layer capacity on the layer-by-layer basis, a layer capacity larger than the layer capacity allocated to an upper level layer located above a lowest level layer may be allocated to the lowest level layer located at the bottom among the plurality of layers. According to the above-described structure, since the layer to which the reference image belongs is restricted to the layer in the same level as or lower level than the layer to which the current image belongs, it is highly likely that an image that belongs to the lowest level layer is referred to for over a longer period of time than an image that belongs to an upper level layer. In view of the above, with the memory managing method according to an aspect of the present invention, a layer capacity larger than a layer capacity allocated to the upper level layer is allocated to the lowest level layer, and thus it is possible to store, over a long period of time, the image that belongs to the lowest level layer, in the memory. As a result, when an image that belongs to the lowest level layer is referred to, it is possible to prevent such a situation as that the image is deleted from the memory and thus cannot be referred to.

In addition, the memory management method described above may further comprise marking an attribute on an image that belongs to a layer located above a layer to which the current image that is a target of coding or decoding belongs, among the plurality of images stored in the memory. For example, in the marking of an attribute, an attribute that indicates that the image is unused for reference is marked.

According to the above-described structure, since the attribute is marked on the image, it is possible to easily identify an unnecessary image which is not to be used for reference and to delete the image from the memory prior to deleting other images. As a result, it is possible to effectively utilize the capacity of the memory.

It is to be noted that the present invention can be implemented not only as the image coding method, the image decoding method, and the memory managing method as described above but also as an apparatus for executing processes according to the above-mentioned methods, an integrated circuit, a program for causing a computer to execute the processes according to the methods, and a recording medium on which the program is stored.

The image coding method and the image decoding method according to the present invention can reduce the processing loads.

Further Information about Technical Background to this Application

The disclosure of U.S. Provisional Application No. 61/432,683, filed Jan. 14, 2011 and U.S. Provisional Application No. 61/437,145, filed Jan. 28, 2011 including specification, drawings and claims are incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 23 illustrates a structure of the multiplexed data;

FIG. 26 is a drawing showing a structure of TS packets and source packets in the multiplexed data;

FIG. 27 is a drawing showing a data structure of a PMT;

FIG. 34 is a drawing showing an example of a look-up table in which the standards of video data are associated with the driving frequencies;

FIG. 35A is a drawing showing an example of a configuration for sharing a module of a signal processing unit; and FIG. 35B is a drawing showing another example of a configuration for sharing a module of a signal processing unit.

DESCRIPTION OF THE PREFERRED EMBODIMENTS

Figure 1:
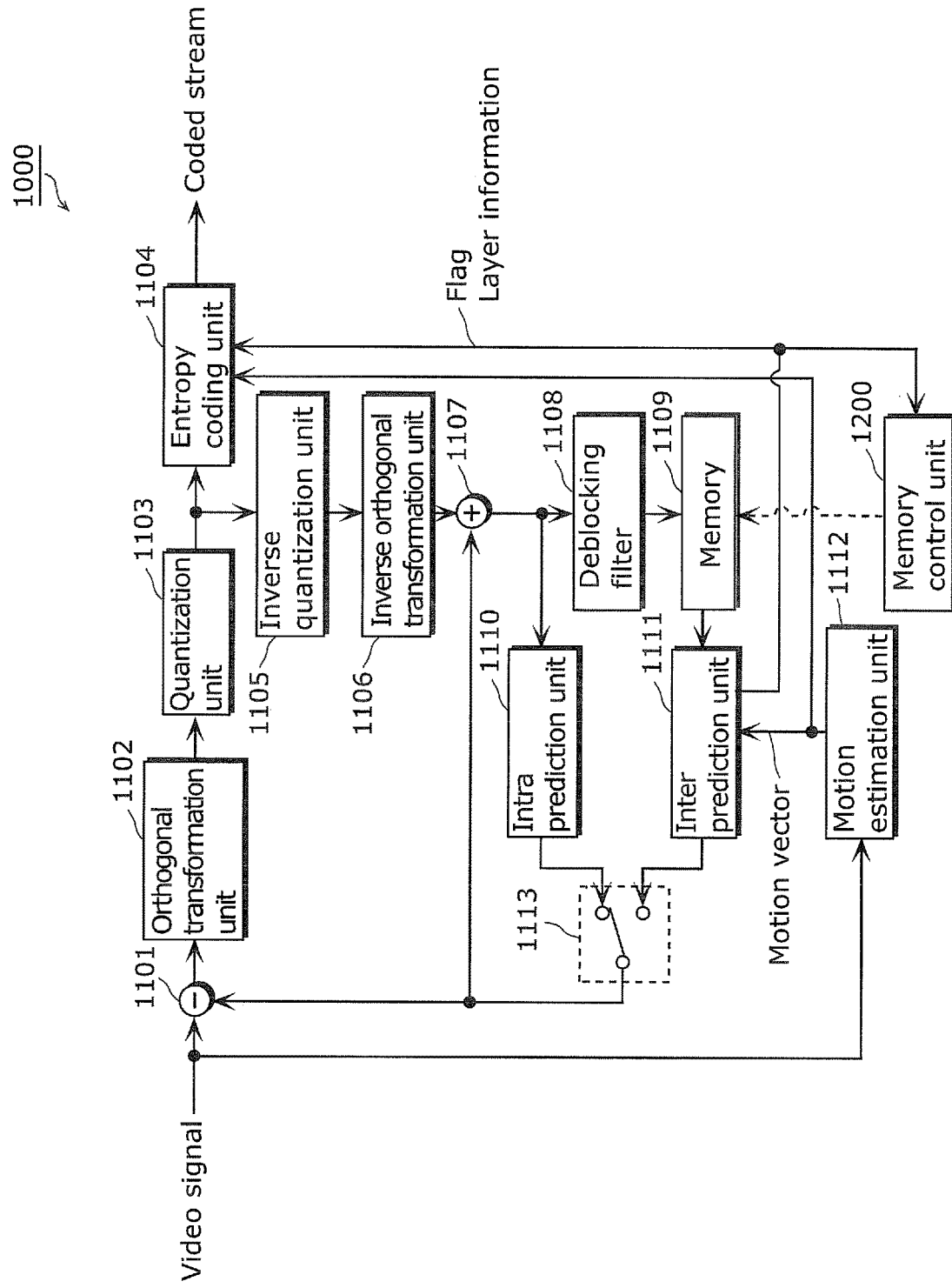
FIG. 1 is a block diagram illustrating an image coding apparatus according to Embodiment 1 of the present invention.

First, prior to describing embodiments according to the present invention, some processes performed when coding or decoding an image will be described.

For example, an image coding apparatus and an image decoding apparatus construct a reference list (also referred to as a reference picture list). More specifically, these apparatuses, when coding or decoding a slice such as a B-slice with referenced to another picture, construct a reference list on which pictures to be referred to for the slice (a macroblock included in the slice) are listed. In this process, it is necessary to sort pictures in picture numerical order in the reference list (sorting process at the time of initialization of the reference list). For example, the image coding apparatus and the image decoding apparatus, upon obtaining the B-slice, add a reference picture that is referred to for the B-slice (a picture used for both a short-time reference and a long-time reference. Hereinafter the same applies) to the reference list (L0, L1). Here, the image coding apparatus and the image decoding apparatus sort the reference pictures in the reference list (L0, L1) in descending order (a young first order) according to the picture numbers (Pic Num) of the reference pictures.

In addition, the image coding apparatus and the image decoding apparatus cause a single logical memory (DPB: Decoded Picture Buffer) to hold such a picture as a reference picture which is referred to over a long period of time, for example. Here, in order to prevent the memory from being saturated, it is required to mark an attribute on each of these pictures held in the memory to manage these pictures.

For example, the image coding apparatus and the image decoding apparatus mark an attribute "unused for reference" on a picture that is not used as a reference picture, upon determining that the picture becomes less likely to be referred to or receiving a predetermined command (MMCP: memory management command). It is to be noted that the predetermined command is a command which specifies that a picture to be managed is not referred to. More specifically, such a method or control of marking includes a FIFO (First-in First-out) management method and an adaptive memory control using a memory management controlling command.

Here, the flexibility of the reference structure that is made possible by the picture definition of H.264 does not directly contribute to facilitating implementation of the image decoding apparatus. Although the flexibility of the reference structure can contribute to improvement of compression coding efficiency, whether or not the flexibility can contribute to facilitating implementation of the image decoding apparatus that reproduces coded data (coded stream) is another story. Thus, the flexibility of the reference structure increases the processing load of the image coding apparatus and the image decoding apparatus. For example, there is the case where implementation of the image decoding apparatus is facilitated when it is possible to determine that constraint conditions are imposed.

In addition, there is the case where at least excessive flexibility puts a limitation on general processes. For example, when the image coding apparatus and the image decoding apparatus which refer to a large number of reference pictures over a long period of time manage a memory (performing marking processing) using the above-mentioned FIFO method, there is a case where a picture necessary for reference is deleted from the memory due to a limited size of the memory. Furthermore, when the image coding apparatus and the image decoding apparatus perform the adaptive memory control using the above-mentioned memory management command, a command (memory management command) is required every time the control of performed.

In view of the above, the image coding method and the image decoding method according to an embodiment of the present invention are characterized by reducing the processing load using a reference structure on which a constraint condition is imposed. In addition, the memory managing method according to an embodiment of the present invention is characterized by preventing an increase of the processing load, there by preventing a picture necessary for reference from being deleted from a memory.

An embodiment according to the present invention will be described below with reference to the drawings. It is to be noted that each of the embodiments explained below describes a preferred specific example of the present invention. A numerical value, shape, material, structural elements, layout positions and connection forms of the structural elements, steps, the order of steps, and the like are examples, and are not intended to limit the present invention. The present invention is limited only by the scope of the claims. Thus, among the structural elements in the embodiments below, the structural elements which are not described in the independent claims that indicate the broadest concept of the present invention are not necessarily required for solving the problem of the present invention, but are explained as components for a more preferred embodiment.

(Embodiment 1)

FIG. 1 is a block diagram illustrating an image coding apparatus according to Embodiment 1 of the present invention.

An image coding apparatus 1000 according to the present embodiment is characterized in that a restriction according to a layer structure of a picture is imposed on reference of the picture in inter prediction coding. The image coding apparatus 1000 described above includes: a subtractor 1101; an orthogonal transformation unit 1102; a quantization unit 1103; an entropy coding unit 1104; an inverse quantization unit 1105; an inverse orthogonal transformation unit 1106; an adder 1107; a deblocking filter 1108; a memory 1109; an intra prediction unit 1110; an inter prediction unit 1111; a motion estimation unit 1112; a switch 1113; and a memory control unit 1200. The subtractor 1101 obtains a video signal, and a prediction image from the switch 1113. Then, the subtractor 1101 subtracts the prediction image from a current block to be coded included in the video signal, thereby generating a differential image.

The orthogonal transformation unit 1102 performs orthogonal transformation (frequency transformation) such as discrete cosine transformation on the differential image generated by the subtractor 1101, thereby transforming the differential image into a coefficient block including plural frequency coefficients. The quantization unit 1103 quantizes each of the frequency coefficients included in the coefficient block, thereby generating a quantized coefficient block. The inverse quantization unit 11105 performs inverse quantization on the coefficient block quantized by the quantization unit 1103. The inverse orthogonal transformation unit 1106 performs inverse orthogonal transformation (inverse frequency transformation) such as inverse discrete cosine transformation on each of the frequency coefficients included in the coefficient block on which inverse quantization has been performed, thereby generating a decoded differential image.

The adder 1107 obtains a prediction image from the switch 1113 and adds the prediction image to the decoded differential image generated by the inverse orthogonal transformation unit 1106, thereby generating a local decoded image (re-configuration image).

The deblocking filter 1108 removes blocking effects of the local decoded image generated by the adder 1107, and stores the local decoded image into the memory 1109. The memory 1109 is a memory for storing the local decoded image as a reference image for inter prediction. It is to be noted that the memory 1109 is used as a decoded picture buffer (DPB).

The intra prediction unit 1110 performs intra prediction on the current block to be coded, using the local decoded image generated by the adder 1107, thereby generating a prediction image (intra prediction image).

The motion estimation unit 112 detects a motion vector for the current block included in the video signal, and outputs the detected motion vector to the inter prediction unit 1111 and the entropy coding unit 1104.

The inter prediction unit 1111 refers to the image stored in the memory 1109 and uses the motion vector detected by the motion estimation unit 1112, thereby performing motion compensation on the current block. The inter prediction unit 1111 performs the motion compensated prediction as described above; that is, performs inter prediction on the current block, thereby generating a prediction image (inter prediction image) of the current block.

In addition, the inter prediction unit 1111 stratifies pictures included in the video signal. More specifically, the inter prediction unit 1111 classifies, into layers, the pictures included in the video signal, such that each of the pictures belongs to a corresponding one of the layers. It is to be noted that, the inter prediction unit 1111, for example, stratifies plural pictures in the present embodiment; however, each of the images to be stratified is not limited to a picture, and other units of image such as a slice may be used.

In such a case, the inter prediction unit 1111 refers, as a reference picture for the current picture to be coded, to a picture that belongs to the second layer that is present within a range that is restricted according to the first layer to which the current picture that is one of the pictures belongs. More specifically, the inter prediction unit 1111 prohibits referring to a picture that belongs to a layer above, or in a higher level than, the first layer, and refers, as a reference picture, to a picture that belongs to the second layer located in a range restricted to be in the same or lower level than the first layer.

In addition, the inter prediction unit 1111 generates a flag indicating whether or not to impose a restriction on selecting of a reference picture that is referred to in coding of the current picture to be coded that is one of the pictures, and outputs the flag to the entropy coding unit 1104. For example, when the reference restriction based on the layer structure is imposed on the current picture as described above, the inter prediction unit 1111 generates a flag indicating 1 and outputs the flag to the entropy coding unit 1104. In other words, in the case where the flag that indicates adding of a restriction, the inter prediction unit 1111 selects, as a reference picture for the current picture, a picture that meets the condition restricted according to the first layer to which the current picture belongs.

In addition, the inter prediction unit 1111 generates, for each of the pictures that are stratified, layer information indicating a layer to which the picture belongs, and outputs the layer information to the entropy coding unit 1104 and the memory control unit 1200.

The switch 1113, when intra prediction coding is performed on the current block to be coded, outputs the prediction image (intra prediction image) generated by the intra prediction unit 1110 to the subtractor 1101 and the adder 1107. In contrast, when inter prediction coding is performed on the current block to be coded, the switch 1113 outputs the prediction image (inter prediction image) generated by the inter prediction unit 1111 to the subtractor 1101 and the adder 1107.

The entropy coding unit 1104 performs entropy coding (variable length coding) on: the coefficient block quantized by the quantization unit 1103; a motion vector detected by the motion estimation unit 1112; and the flag and the layer information generated by the inter prediction unit 1111, thereby generating a coded stream. Through the processes described above, the coded stream includes the flag and the layer information described above.

The memory control unit 1200 obtains, from the inter prediction unit 1111, layer information of each of the pictures, and manages the picture stored in the memory 1109, based on a layer of the picture indicated by the layer information; that is, based on a layer structure. More specifically, the memory control unit 1200 allocates, as a layer capacity, a part of available memory capacity in the memory 1109, for each of the layers. Then, the memory control unit 1200 stores a current picture to be stored into a region, within the memory 1109, which is restricted to the layer capacity that is a capacity allocated to the layer to which the current picture belongs. It is to be noted that, when the region has no remaining capacity available for storing the current picture to be stored, the memory control unit 1200 may delete, from the region, an existing picture stored earliest among one or more existing pictures stored already in the region, such that the current picture is stored.

Here, when allocating a layer capacity for each of the layers, the memory control unit 1200 allocates, to a lowest level layer located at the bottom among the layers, a layer capacity larger than a layer capacity allocated to an upper level layer located above the lowest level layer.

In addition, the memory control unit 1200 marks an attribute on a picture that belongs to a layer located above a layer to which the current picture to be coded belongs, among the pictures stored in the memory 1109. More specifically, the memory control unit 1200 marks an attribute that indicates that the picture is not used for reference.

The following describes in detail a layer structure and a reference structure of a picture, which is constructed by the inter prediction unit 1111.

Figure 2:
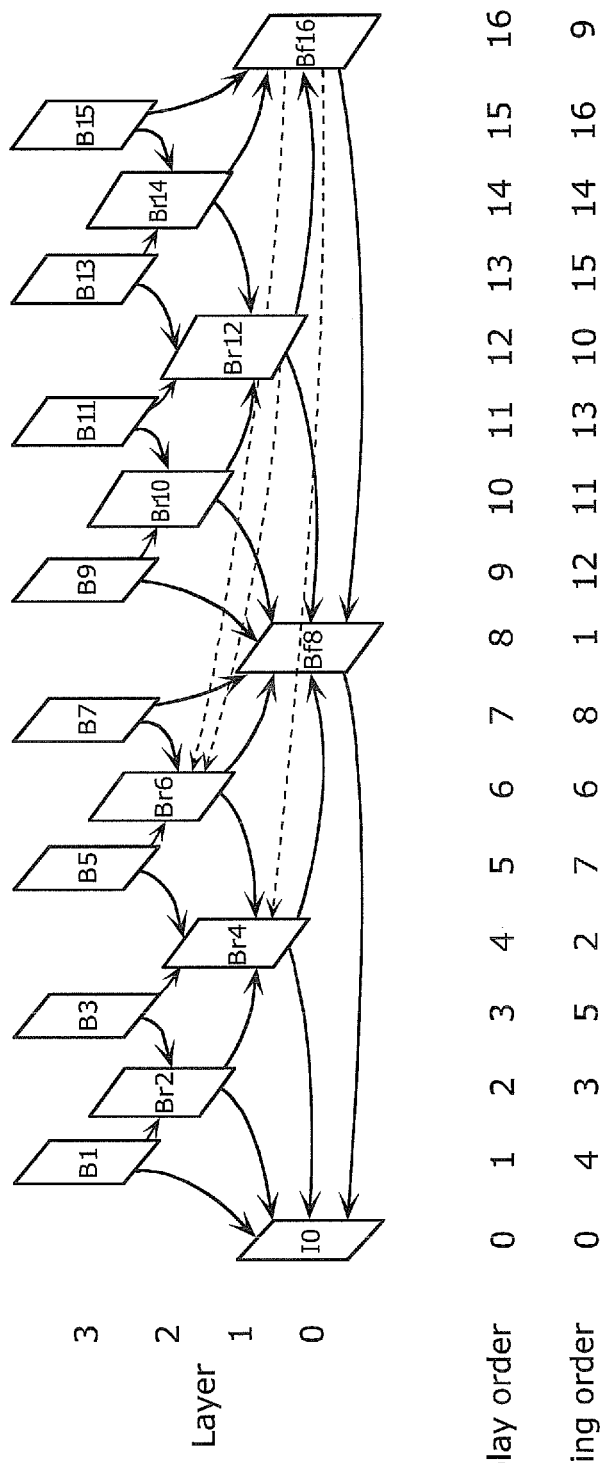
FIG. 2 is a diagram illustrating a reference structure constructed by an inter prediction unit 1111 according to Embodiment 1 of the present invention.

FIG. 2 is a diagram illustrating a layer structure and a reference structure constructed by the inter prediction unit 1111. It is to be noted that, in FIG. 2, an alphabet and a numeric character added to a picture indicate a picture type and a display order, respectively, of the picture. For example, I0 indicates a picture type "I" and the display order of the picture "0", and Br2 indicates a picture type "B" and the display order of the picture "2".

The inter prediction unit 1111 defines a reference structure based on a layer structure constructed by classifying plural pictures included in a video signal into layers, as shown in FIG. 2. Here, the inter prediction unit 1111 uses a picture positioned at a top in the display order among the plural pictures, as an I-picture, and uses pictures except for the I-picture at the top, as a B picture. In addition, when the inter prediction unit 1111 performs inter prediction on a picture that belongs to a layer, for each of the plural layers, refers to a picture that belongs to the same level as or lower level than the layer. More specifically, with the reference structure constructed by the inter prediction unit 1111, a restriction is imposed which does not allow reference to a picture classified into a layer above or higher than a layer to which a current picture to be coded belongs (which allows reference to a picture in a layer which is the same as or a layer lower than the current layer).

For example, the inter prediction unit 1111 refers to a picture I0 that belongs to a layer 0 and a picture Br2 that belongs to a layer 2 when performing inter prediction on a picture B1 that belongs to a layer 3, as shown in FIG. 2. In addition, when performing inter prediction on a picture Bf8 that belongs to the layer 0 in the lowest level, the inter prediction unit 1111 refers to the picture I0 that belongs to the same layer 0. Here, only the preceding pictures in the display order can be referred to for the inter prediction of a picture that belongs to the layer 0 in the lowest level.

As described above, with the reference structure according to the present embodiment, it is possible to improve the compression efficiency of a video signal because the pictures, other than the I-picture, are the B-pictures. In general, a picture that is coded with reference to more reference pictures can improve the compression efficiency more than a picture that is coded with reference to less reference pictures. Thus, with the reference structure according to the present embodiment, it is possible to improve the compression efficiency of a video signal because the pictures, other than the I-picture, are the B-pictures.

In addition, with the reference structure according to the present embodiment, a picture that belongs to a layer in a higher level among plural layers is coded with reference to a picture that belongs to the same layer or a picture that belongs to a layer in a lower level. This makes it easier to perform a special reproduction such as double-speed reproduction in a reproduction apparatus including an image decoding apparatus.

When performing high-speed reproduction, for example, the reproduction apparatus reproduces only the pictures that belong to the layer 0. With the reference structure illustrated in FIG. 2, the reproduction apparatus reproduces the pictures I0, Bf8, and Bf16. The pictures that belong to the layers 0 and 1 are reproduced when the reproduction speed is to be slowed down, and the pictures that belong to the layers 0, 1, and 2 are reproduced when the reproduction speed is to be further slowed down. As described above, it is possible to easily achieve flexible high-speed reproduction by defining the reference structure according to layers.

More specifically, when the image coding apparatus codes a current picture to be displayed which is displayed in special reproduction with reference to a picture, as a reference picture, which belongs to a layer in a level higher than a layer to which the current picture belongs, the reproduction apparatus needs to decode the reference picture despite that the reference picture is not displayed in the special reproduction. However, with the image coding apparatus 1000 according to the present embodiment, it is prohibited, for each of the pictures, to refer to a picture that belongs to a layer in a level higher than a layer to which the each of the pictures belongs. Therefore, it is possible to relieve the reproduction apparatus of the bother of decoding a reference picture that is not displayed in a special reproduction. As a result, according to the present embodiment, it is possible to reduce the processing load of the image decoding apparatus included in the reproduction apparatus.

Here, the inter prediction unit 1111 generates a flag as described above. More specifically, the inter prediction unit 1111 outputs a flag that determines, with one bit, whether a video signal (stream) is (i) coded with a hierarchical constraint condition for a specific purpose (special reproduction, for example) or (ii) a stream that is coded without a constraint condition. The entropy coding unit 1104 adds the flag (1 bit) to a top of an access unit (random access unit or sequence, for example) in a coded stream, for example. This allows the reproduction apparatus to determine, with the least number of bits, whether or not a coded stream or a coded picture is for a specific purpose such as high-speed reproduction and random access. As a result, it is possible to minimize the effect of compatibility for a coded stream that is a video signal coded by the conventional H.264 standard and the image decoding apparatus that decodes the coded stream. In addition, information indicating the layer structure and the reference structure according to a purpose; that is, information indicating whether or not a constraint is imposed may be added to an additional portion such as SEI (Supplemental enhancement information) separately from the aforementioned flag (1 bit).

In addition, the inter prediction unit 1111 generates layer information as described above. More specifically, the inter prediction unit 1111 outputs, for each picture, layer information (identification information) for identifying to which layer the picture belongs. The entropy coding unit 1104, at this time, adds the layer information to a header of a picture corresponding to the layer information. More specifically, the inter prediction unit 1111 allocates the same layer information to all of the slices in a picture (frame or field pair). This is because it is not necessary to allocate each portion (slice) in the picture to a corresponding one of layers different from each other in the case of special reproduction such as high-speed reproduction or random access. Through the processes described above, the entropy coding unit 1104 adds the layer information to a header of a picture, such as a picture parameter set.

As a result, when performing high-speed reproduction of the coded stream, the reproduction apparatus obtains the layer information from the header of the picture and reproduces only the pictures necessary for the high-speed reproduction.

In addition, the entropy coding unit 1104 may dispose plural items of layer information collectively at the top of a coded stream. More specifically, the entropy coding unit 1104 disposes at the top of a coded stream, as management information, each of the layer information of plural pictures included in the coded stream, according to coding order or display order of the pictures. The reproduction apparatus can determine what kind of high-speed reproduction (special reproduction) can be performed, by reading the management information at the top before decoding the coded stream.

In addition, in such a case as storing the coded stream in an optical disk, the entropy coding unit 1104 may store, in the optical disk, management information separately from the coded stream. By storing the management information separately from the coded stream, it is possible for the reproduction apparatus to determine what kind of high-speed reproduction can be performed, prior to reproducing the coded stream.

It is to be noted that, according to the present embodiment, a picture that belongs to a layer in a high level is coded with reference to a picture that belongs to a layer in the same level or in a lower level. However, a picture that belongs to a layer in a predetermined level may exceptionally be coded with reference to a picture that belongs to a layer in a higher level than the predetermined level. As shown by dotted arrows in FIG. 2, for example, a picture that belongs to a layer in a lowest level is coded with reference to a picture that belongs to a layer in a higher level. To be specific, the picture Bf16 that belongs to the layer 0 in the lowest level is coded with referenced to the picture Br4 that belongs to the layer 1 in a higher level and the picture Br6 that belongs to the layer 2 in a higher level.

As described above, a picture that belongs to a layer in a predetermined level refers to a picture that belongs to a layer in a higher level, thereby enabling further improving of the compression efficiency of a video signal. Meanwhile, since a restriction is imposed on the special reproduction, information that indicates what kind of special reproduction can be performed may be newly added to the coded stream. For example, information is added which indicates up to which layer of pictures can be referred to by a picture that belongs to a layer in the lowest level. As illustrated in FIG. 2, for example, the inter prediction unit 1111 outputs information indicating that reference can be made up to the picture that belongs to the layer 2, and the entropy coding unit 1104 adds the information to the coded stream. As a result, the reproduction apparatus determines, based on the information, that it is possible to reproduce pictures that belong to their respective layers 0, 1, and 2 and pictures that belong to their respective layers 0, 1, 2, and 3, as special reproduction. The information indicating up to which layer of pictures can be referred to may be added to the header of the coded stream, or may be stored as management information different from the coded stream.

It is to be noted that the inter prediction unit 1111, in performing inter prediction of a picture that follows to a picture that belongs to a layer in the lowest level in the display order, may prohibit referring to a picture that precedes the picture that belongs to a layer in the lowest level in the display order. In other words, the inter prediction unit 1111 regards the picture that belongs to the layer in the lowest level as a criterial picture for setting a reference restriction. With such a reference restriction, it is possible to ensure, when the image decoding apparatus randomly accesses a picture that belongs to the layer in the lowest level, decoding pictures positioned subsequent to the picture that is randomly accessed. In addition, the inter prediction unit 1111 may output, to a picture that belongs to the layer in the lowest level, information indicating whether or not the picture is the criterial picture for the reference restriction. In this case, the entropy coding unit 1104 adds, to the picture, information indicating whether or not the picture is the criterial picture. According to the processes as described above, since the criterial picture and pictures other than the criterial picture are present together in the layer in the lowest level, it is possible to achieve both of improvement of the compression efficiency and random access of a video signal.

Here, the criterial picture may be a picture that belongs not to the layer in the lowest level but to a layer in a level lower than the current picture to be coded, for example. To be specific, the criterial picture is a picture that belongs to the second layer positioned in a range restricted according to the first layer to which the current picture belongs; that is, a range restricted to be lower than the first layer. For example, the criterial picture is present between the current picture and a candidate picture in the coding order. In this case, the inter prediction unit 1111, when selecting a reference picture, prohibits selecting, as the reference picture, of the candidate picture that precedes to the current picture in the coding order and selects a picture other than the candidate picture as the reference picture. With this, it is possible to select an appropriate picture as the reference picture and further reduce the processing load.

In addition, the inter prediction unit 1111 may refer to a picture in the layer in the lowest level, in performing inter prediction on a picture at an access position of random access. More specifically, in performing inter prediction on a picture that belongs to the layer 3 that can be the access position of random access, only a picture that belongs to the layer 0 may be referred to as the reference picture. This allows the image decoding apparatus to directly refer, when decoding a picture at an access position of random access, to the reference picture in the layer 0 and decode the picture at the access position without decoding a picture in an intermediate layer; that is, a layer between a layer to which the picture at the access position belongs and the layer 0 in the lowest level. In addition, additional coding data such as Switching P (SP) slice is not required.

The following describes in detail a memory managing method for managing the memory 1109, performed by the memory control unit 1200.

Figure 3:
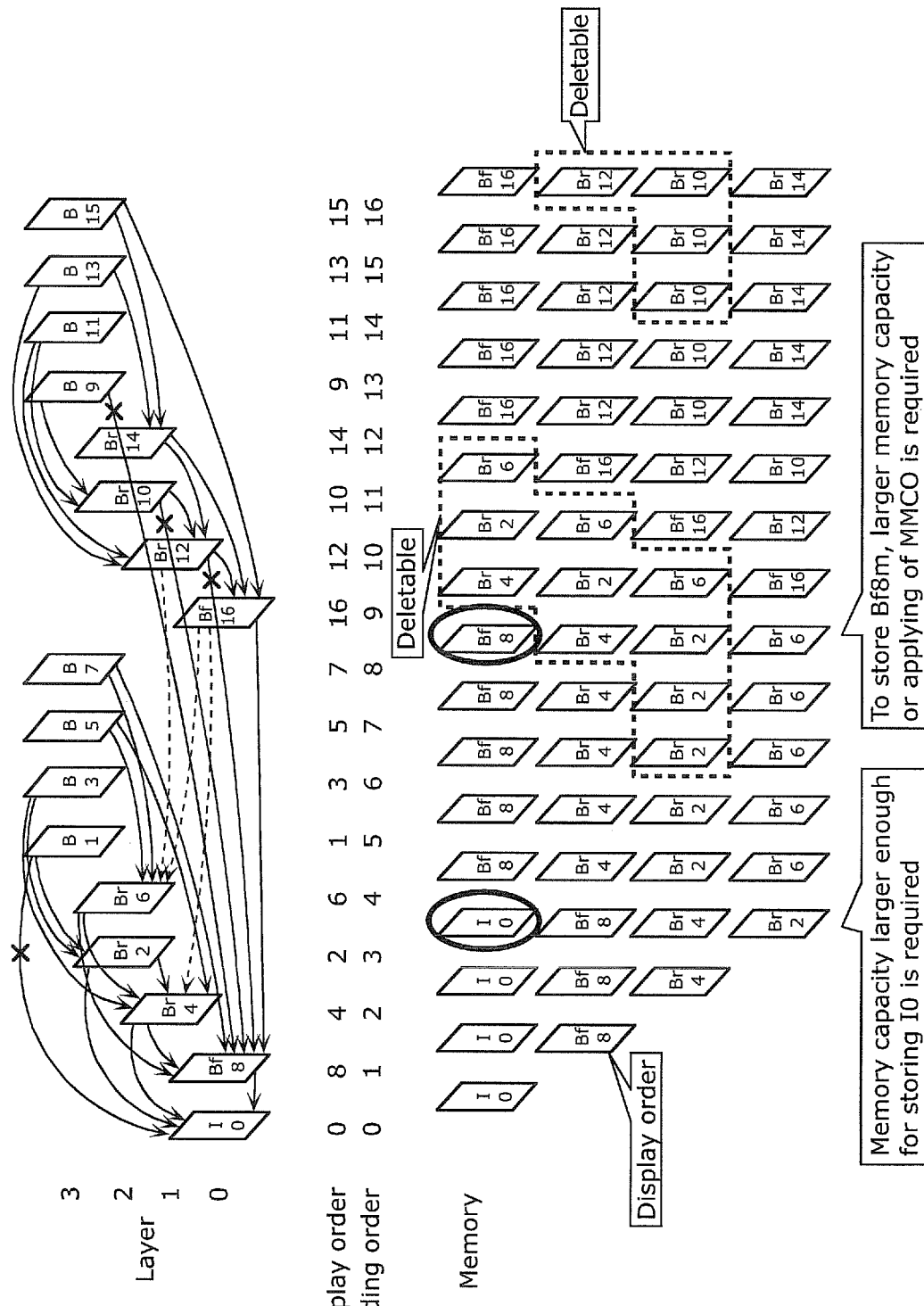
FIG. 3 is an example of a memory managing method in the case where a necessary reference picture is deleted.

For example, when a memory managing method according to existing H.264 standard is simply applied to the reference structure illustrated in FIG. 2, a reference picture that is referred to for coding a current picture to be coded is deleted from the memory 1109, causing a case where the reference picture cannot be referred to in some cases. FIG. 3 is an example of a memory managing method in the case where a necessary reference picture is deleted.

First, the picture I0 is coded and decoded, and stored as a reference picture I0 in the memory in the 0th process in the coding order. Then, the reference pictures are sequentially stored in the memory. The picture I0, the picture Bf8, the picture Br4, and the picture Br2 are stored in the memory in the third process in the coding order. Next, in the fourth process in the coding order, the picture Br6 is newly added to the memory 1109 and the picture I0 stored earliest in the memory is deleted from the memory.

However, since the picture I0 is referred to for the coding of the picture B1 in the fifth process in the coding order, the picture I0 needs to be decoded again in the fifth process. In other words, the memory is required to have a capacity large enough to store the picture I0 in the memory for the coding of the picture B1.

In the same manner as above, the picture Br8 is deleted from the memory in the ninth process in the coding order. However, since the picture Bf8 is referred to for the coding of the picture Br12 in the tenth process in the coding order, the picture Bf8 needs to be decoded again in the tenth process. In other words, in order to make sure that the picture Bf8 is stored in the memory in the tenth process in the coding order, the memory is required to have a larger capacity. Alternatively, the memory management command (MMCO) needs to be applied.

As stated above, simply applying the memory managing method according to existing H.264 standard to the reference structure illustrated in FIG. 2 poses a problem that a reference picture that should be stored in the memory is deleted.

In order to solve such a problem, a restriction may be imposed on the coding order of pictures.

Figure 4:
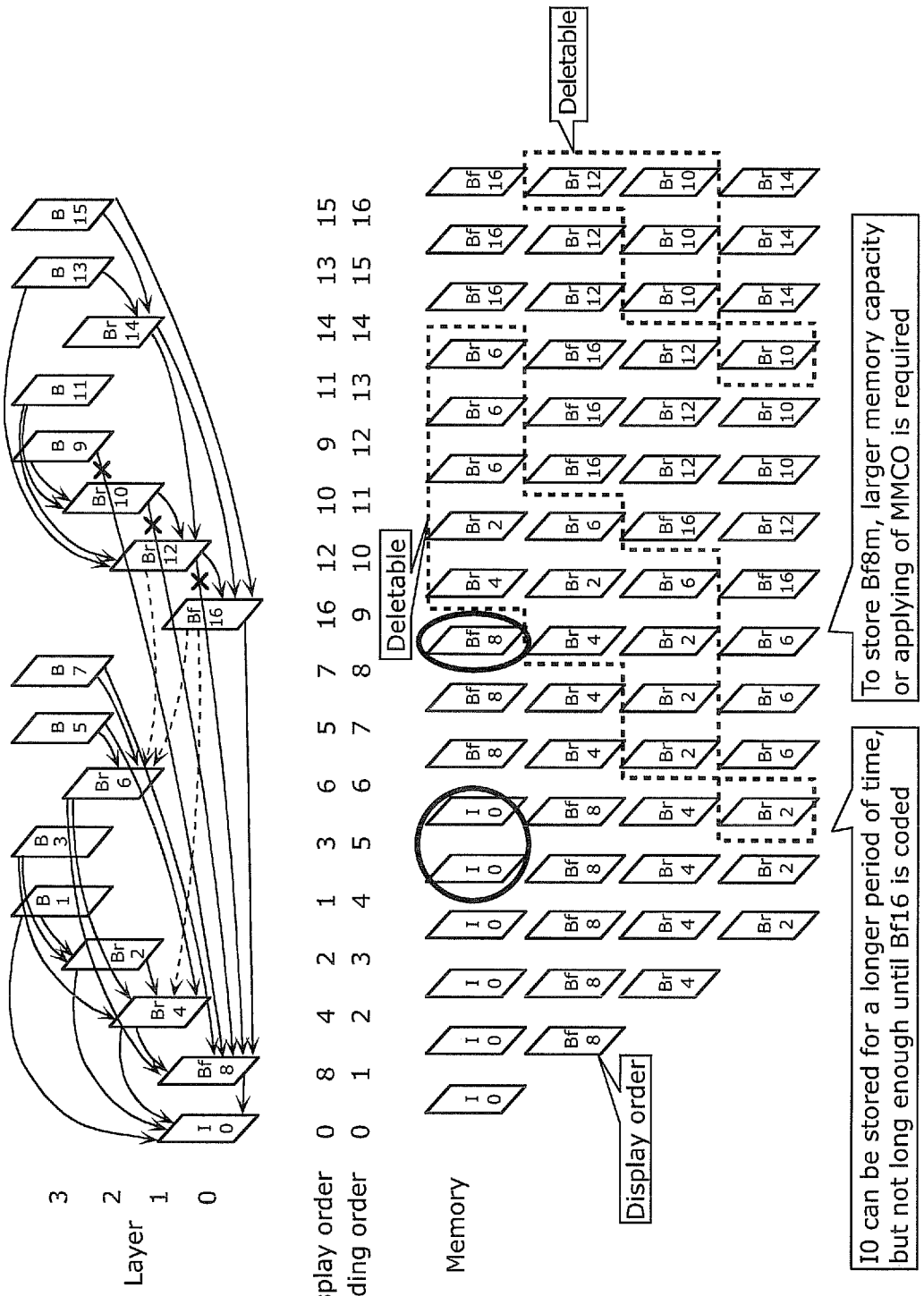
FIG. 4 is a diagram illustrating an example of the memory managing method when a restriction is imposed on the coding order of pictures.

FIG. 4 is a diagram illustrating an example of the memory managing method when a restriction is imposed on the coding order of pictures. For example, a restriction is imposed that a picture that belongs to a layer other than a layer in the highest level is coded at the latest time possible in cording order. It is to be noted that, even under such a restriction, a picture that follows in the coding order is not referred to for coding of a picture that precedes in the coding order. In addition, the coding order is the same as the decoding order.

To be specific, in the coding order shown in FIG. 4, the picture Br6 in the layer 2 follows the pictures B1 and B3 in the layer 3 in the coding order. When coding the picture B1 in the layer 3 according to such a coding order, the picture I0 that is referred to by the picture B1 is stored in the memory 1109. Thus, it is possible to omit the trouble of decoding the picture I0 again and to reduce the increase in the capacity of the memory 1109.

However, even in such a case, the picture Br8 is deleted from the memory through the ninth process (coding and decoding of the picture Bf16) in the coding order. As a result, since the picture Bf8 is referred to for the coding of the picture Br12 in the tenth process in the coding order, the picture Bf8 needs to be decoded again. In other words, in order to make sure that the picture Bf8 is stored in the tenth process in the coding order, the memory is required to have a larger memory capacity. Alternatively, the memory management command (MMCO) needs to be applied.

Figure 5:
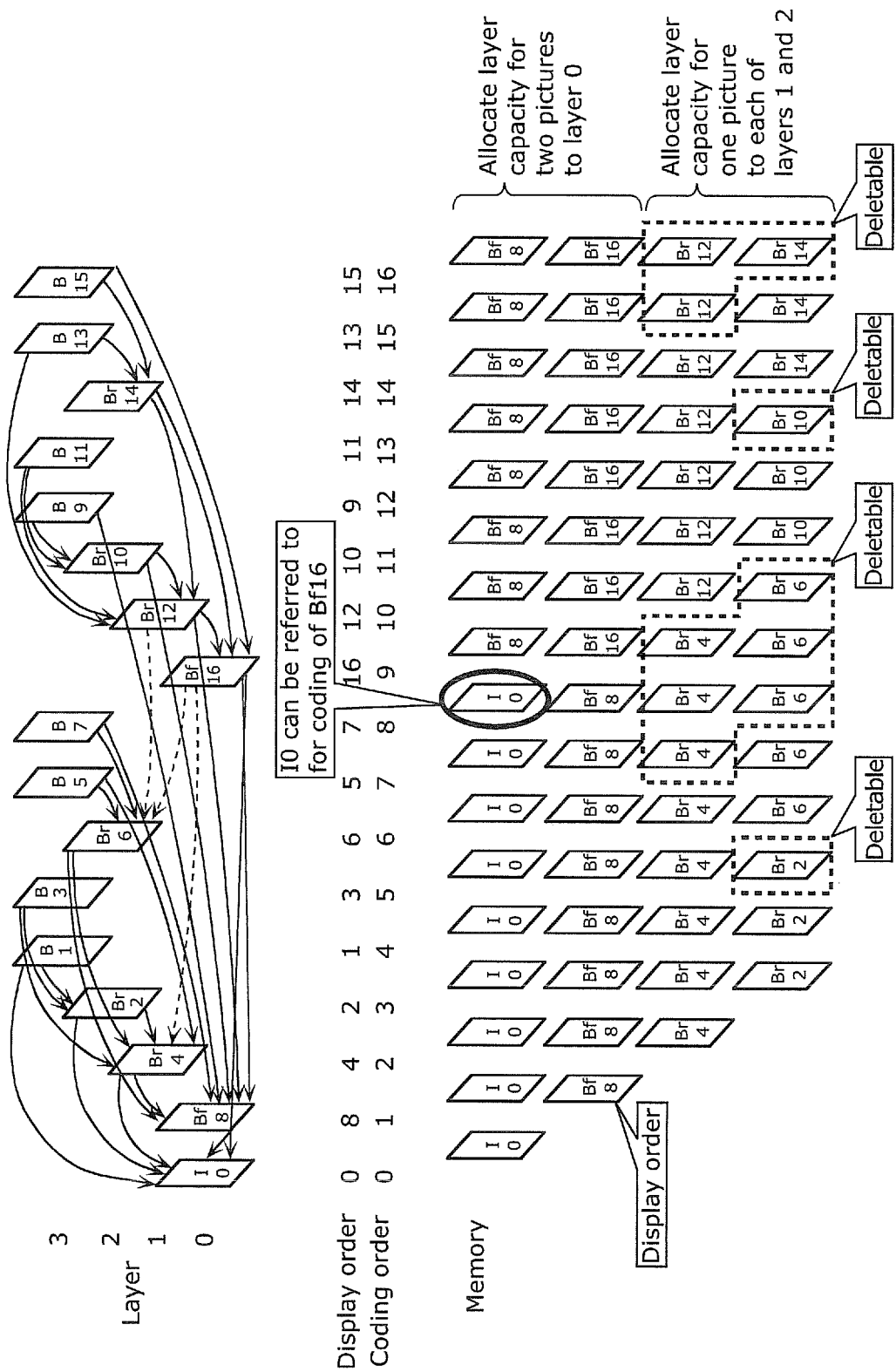
FIG. 5 is a diagram illustrating the memory managing method performed by a memory control unit 1200 according to Embodiment 1 of the present invention.

FIG. 5 is a diagram illustrating the memory managing method performed by the memory control unit 1200 according to the present embodiment.

The memory control unit 1200 manages the memory 1109 using the layer structure and the reference structure of a picture. For example, the memory 1109 has a memory capacity for storing four pictures. In this case, the memory control unit 1200 allocates, to the layer 0 in the lowest level, the memory capacity for two pictures as a layer capacity, out of the memory capacity for four pictures which is the available capacity of the memory 1109. In addition, the memory control unit 1200 allocates, to each of the layer 1 and the layer 2, the memory capacity for one picture as the layer capacity, out of the abovementioned memory capacity for four pictures of the memory 1109. More specifically, the layer capacity for one picture is allocated to each of the intermediate layers other than the layer 0 in the lowest level and the layer 3 in the highest level.

Next, the memory control unit 1200 obtains, from the inter prediction unit 1111, the layer information of a picture included in the video signal. In the case where the layer information indicates the layer 0, the memory control unit 1200 stores the picture in a region of the layer capacity of the memory 1109 which is allocated to the layer 0. In addition, in the case where the layer information indicates the layer 1 or 2, the memory control unit 1200 stores the picture in a region of the layer capacity of the memory 1109 which is allocated to the layer 1 or 2.

In the present embodiment as described above, the layer capacity is allocated more to the layer in a low level to which a picture more likely to be referred to by other pictures belongs, and allocated less to the layer in a high level to which a picture less likely to be referred to by other pictures belongs. This makes it possible to store, without fail, in the memory 1109 the reference picture necessary for coding and decoding without enlarging the memory capacity or applying MMCO. It is to be noted that how to allocate the layer capacity is not limited to the example shown in FIG. 5. It is only necessary for the memory control unit 1200 to allocate the layer capacity more to the layer in the low level. For example, the memory control unit 1200 may allocate the layer capacity for three pictures to the layer 0 and the layer capacity for one picture to all of the other layers 1 and 2.

Figure 6:
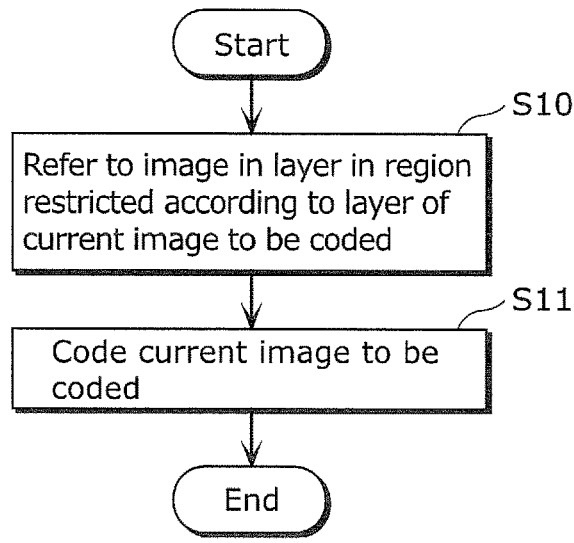
FIG. 6 is a flowchart illustrating processes performed by an image coding apparatus 1000 according to Embodiment 1 of the present invention.

FIG. 6 is a flowchart illustrating processes performed by the image coding apparatus 1000 according to the present embodiment.

The inter prediction unit 1111 of the image coding apparatus 1000 refers to, as a reference image for a current image to be coded, an image that belongs to the second layer in a range restricted according to the first layer to which the current image belongs (Step S10). Then, the image coding apparatus 1000 codes the current image based on the reference image (Step S 11). It is to be noted that the inter prediction unit 1111 serves as a reference unit (the first reference unit) that refers to the reference image according to the present embodiment. In addition, at least one structural element provided in the image coding apparatus 1000 serves as the coding unit which codes the current image.

With this, the layer to which the reference image that is referred to for coding of the current image belongs is present within a range restricted according to the first layer to which the current image belongs. Thus, since the reference image that is referred to for coding of the current image is restricted according to the first layer, it is possible to reduce the processing load of the coding. In addition, since the reference image is restricted when decoding an image coded as described above as well, it is possible to reduce the processing load of the decoding.

Here, when referring to the reference image in Step S10, the inter prediction unit 1111 prohibits referring to an image that belongs to a layer in a higher level than the first layer, and refers, as the reference image, to an image that belongs to the second layer located in a range restricted to the first layer or a layer below the first layer.

With this, since it is prohibited to refer to an image that belongs to a layer positioned higher than the first layer to which the current image belongs, it is possible to code the current image with less processing load. Likewise, since it is not necessary, when decoding a coded image as well, to refer to an image that belongs to a layer located above a layer to which the coded image belongs, it is possible to decode the coded image with less processing load. In addition, in the case where each image included in a video signal is treated as an image to be coded and the video signal is coded, it is not necessary to refer, in decoding of any images included in the coded video signal, to an image that belongs to a layer located above a layer to which the image belongs. Thus, it is only necessary for the image decoding apparatus to decode an image that belongs to a layer that is the target of a special reproduction (high-speed reproduction), and thus it is possible to omit the trouble of decoding and referring to an image that belongs to a layer positioned higher than the layer that is the target of the special reproduction. In the case where the layer that is the target of a special reproduction such as N time-speed reproduction (N>2) is the lowest level layer 0 located at the bottom, the image decoding apparatus does not have to take the trouble of decoding and referring to an image which is not the target of the special reproduction and in the layers 1, 2, and 3 positioned higher than the lowest level layer. It is to be noted that each of the images is a picture or a slice.

Figure 7:
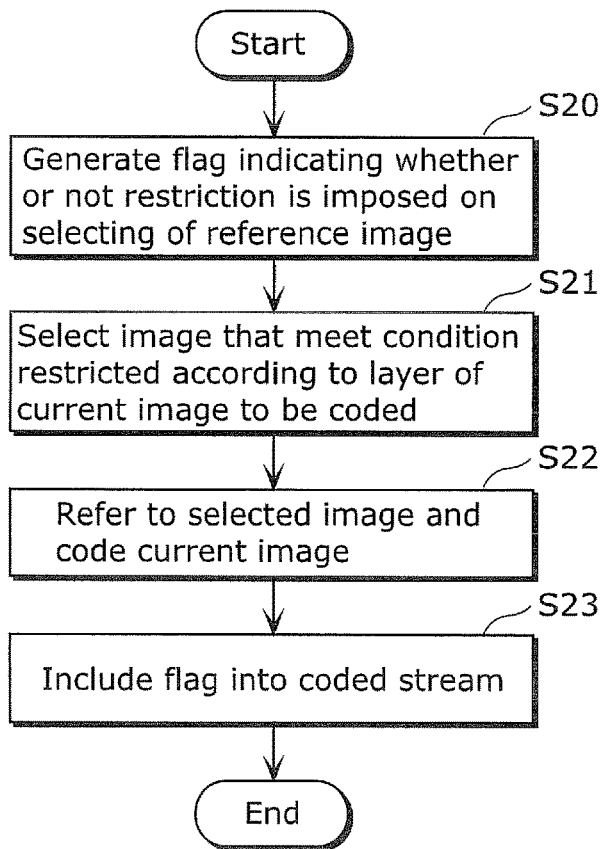
FIG. 7 is a flowchart illustrating processes using a flag, performed by the image coding apparatus 1000 according to Embodiment 1 of the present invention.

FIG. 7 is a flowchart illustrating processes in which a flag is used and which are performed by the image coding apparatus 1000 according to the present embodiment.

The inter prediction unit 1111 of the image coding apparatus 1000 generates a flag that indicates whether or not to add a restriction for selecting of a reference image to be referred to for coding of a current image to be coded (Step S20). Next, in the case where the flag indicates adding of a restriction, the inter prediction unit 1111 selects, as a reference image for the current image, an image that meets the condition restricted according to the restriction according to the first layer to which the current image belongs (Step S21). Next, the image coding apparatus 1000 codes the current image, with reference to the selected reference image (Step S22). Then, the entropy coding unit 1104 of the image coding apparatus 1000 includes the flag into the coded stream that is the coded video signal (Step S23). It is to be noted that the inter prediction unit 1111 serves as a flag generating unit that generates a flag and, at the same time, as a selecting unit that selects a reference image, according to the present embodiment. In addition, at least one structural element provided in the image coding apparatus 1000 serves as the coding unit which codes the current image to be coded. In addition, the entropy coding unit 1104 serves as an insert unit which includes the flag into a coded stream.

Figure 8:
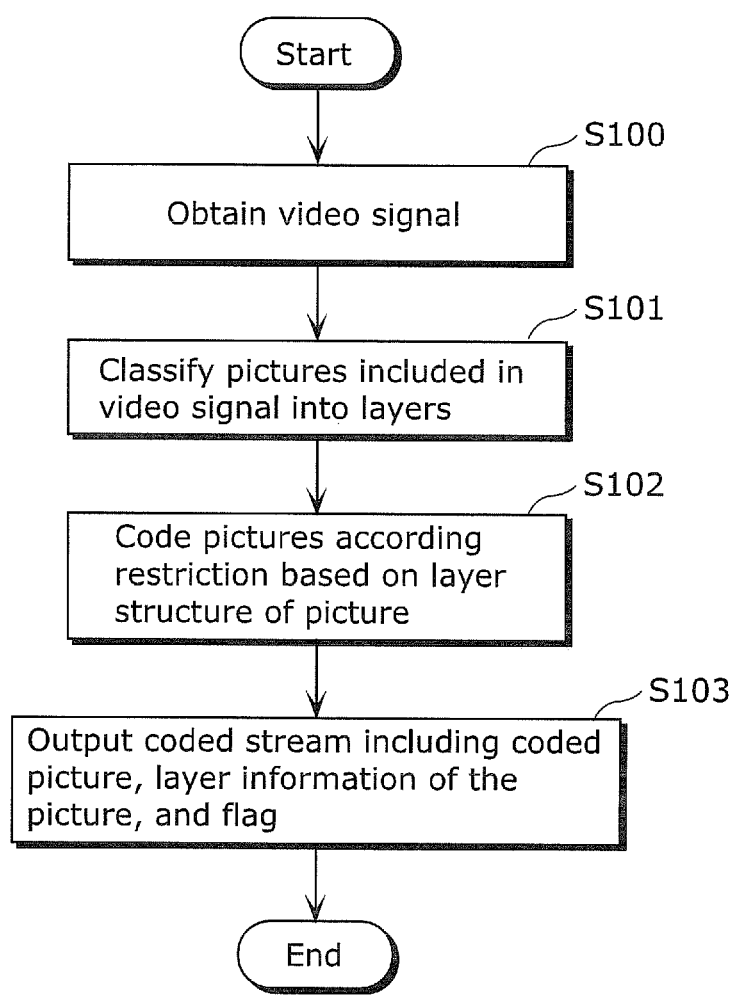
FIG. 8 is a flowchart illustrating specific processes performed by the image coding apparatus 1000 according to Embodiment 1 of the present invention.

With this, in the case where the flag indicates adding of a restriction, an image that meets the condition restricted according to the first layer to which the current image belongs is selected as a reference image. More specifically, a reference image that is referred to for coding of the current image is restricted according to the first layer. As a result, it is possible to reduce the processing load of the coding of the current image. In addition, since a flag that indicates whether or not to impose a restriction for selecting of a reference image is generated and included in a coded stream, it is possible for the image decoding apparatus that decodes the coded stream to easily determine whether or not a restriction is imposed for selecting of the reference image. As a result, the image decoding apparatus can properly decode the coded video signal with less processing load. FIG. 8 is a flowchart illustrating specific processes performed by the image coding apparatus 1000 according to the present embodiment. First, the image coding apparatus 1000 obtains a video signal to be coded (S100).

Next, the image coding apparatus 1000 classifies, into layers, the pictures included in the obtained video signal (Step S101). Then, the image coding apparatus 1000 codes the pictures according to the restriction based on the layer structure of the pictures (Step S 102). Next, the image coding apparatus 1000 outputs a coded stream including the coded pictures, the layer information of the pictures, and a flag (S103).

Figure 9:
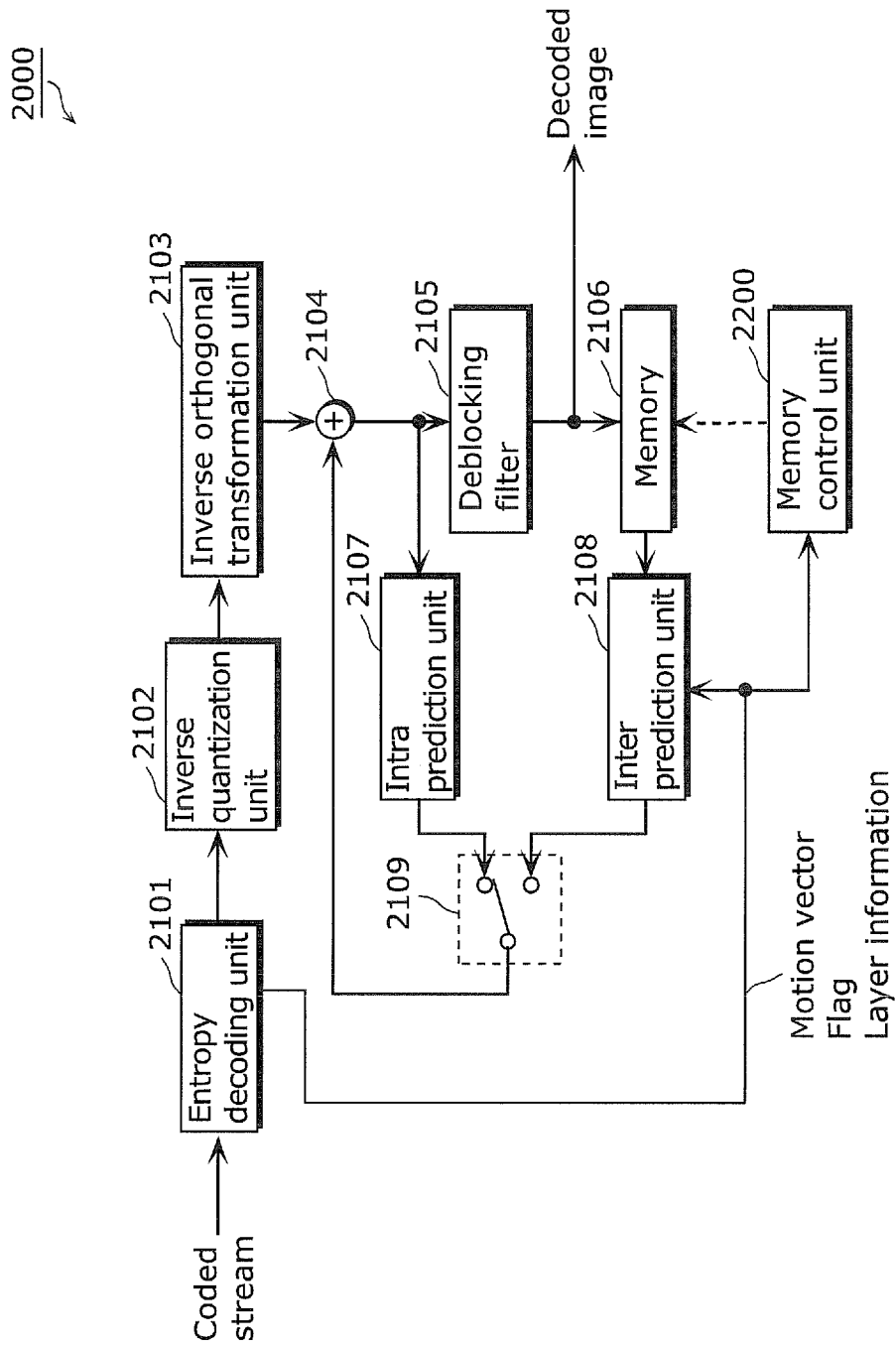
FIG. 9 is a block diagram illustrating an image decoding apparatus according to Embodiment 1 of the present invention.

FIG. 9 is a block diagram illustrating the image decoding apparatus according to an embodiment of the present invention.

An image decoding apparatus 2000 according to the present embodiment is an apparatus that properly decodes a coded stream generated by the image coding apparatus 1000 and includes: an entropy decoding unit 2101; an inverse quantization unit 2102; an inverse orthogonal transformation unit 2103; an adder 2104; a deblocking filter 2105; a memory 2106; an intra prediction unit 2107; an inter prediction unit 2108; a switch 2109; and a memory control unit 2200.

The entropy decoding unit 2101 obtains a coded stream and performs entropy decoding (variable length decoding) on the coded stream. More specifically, the entropy decoding unit 2101 generates a quantized coefficient block, a motion vector, a flag, and layer information, by performing the entropy decoding.

The inverse quantization unit 2102 performs inverse quantization on the quantized coefficient block resulting from the entropy decoding performed by the entropy decoding unit 2101. The inverse orthogonal transformation unit 2103 performs inverse orthogonal transformation (inverse frequency transformation) such as inverse discrete cosine transformation on each of the frequency coefficients included in the inverse quantized coefficient block, thereby generating decoded differential image.

The adder 2104 obtains a prediction image from the switch 2109 and adds the prediction image to the decoded differential image generated by the inverse orthogonal transformation unit 2103, thereby generating a decoded image (re-configuration image).

The deblocking filter 2105 removes blocking effects of the decoded image generated by the adder 2104, stores the decoded image in the memory 2106, and outputs the decoded image.

The intra prediction unit 2107 performs intra prediction on a current block to be decoded, using the decoded image generated by the adder 2104, thereby generating a prediction image (intra prediction image). The inter prediction unit 2108 refers, as a reference image, to the image stored in the memory 2106, and uses the motion vector resulting from the entropy decoding performed by the entropy decoding unit 2101, thereby performing motion compensation on the current block. The inter prediction unit 2108 performs the motion compensation as described above; that is, performs inter prediction on the current block, thereby generating a prediction image (inter prediction image) of the current block.

Here, the inter prediction unit 2108 imposes a restriction on selecting of a reference image in the same manner as the inter prediction unit 1111 of the image coding apparatus 1000. That is, the inter prediction unit 2108 refers, as a reference picture for the current picture to be decoded, to a picture that belongs to the second layer that is present within a range that is restricted according to the first layer to which the current picture belongs. More specifically, the inter prediction unit 2108 prohibits referring to a picture that belongs to a layer above, or in a higher level than, the first layer, and refers, as a reference picture, to a picture that belongs to the second layer that is located in a range restricted to the first layer or a layer below the first layer.

In addition, the inter prediction unit 2108 generates a reference list that indicates one or more pictures each of which belongs to the first layer or a layer below the first layer, other than all of the pictures that belong to their respective layers present higher than the first layer, among the pictures included in the coded stream. The inter prediction unit 2108, when referring to a reference picture, selects a reference picture from the one or more pictures indicated in the reference list.

In addition, the inter prediction unit 2108 obtains the flag described above. Here, in the case where the flag indicates adding of a restriction, the inter prediction unit 2108 selects, as a reference picture for the current picture, a picture that meets the condition restricted according to the first layer to which the current picture belongs. For example, the inter prediction unit 2108 selects a reference picture using a criterial picture in the same manner as the inter prediction unit 1111 of the image coding apparatus 1000. Then, the inter prediction unit 2108 decodes the current picture with reference to the selected reference picture.

The switch 2109, when intra prediction coding has been performed on the current block, outputs the prediction image (intra prediction image) generated by the intra prediction unit 2107 to the adder 2104. Meanwhile, the switch 2109, when inter prediction coding has been performed on the current block, outputs the prediction image (inter prediction image) generated by the inter prediction unit 2108 to the adder 2104.

The memory control unit 2200 obtains, from the entropy decoding unit 2101, layer information of each of the pictures, and manages each of the pictures stored in the memory 2106, based on a layer of the picture indicated by the layer information; that is, based on a layer structure, in the same manner as the memory control unit 1200 of the image coding apparatus 1000.

Figure 10:
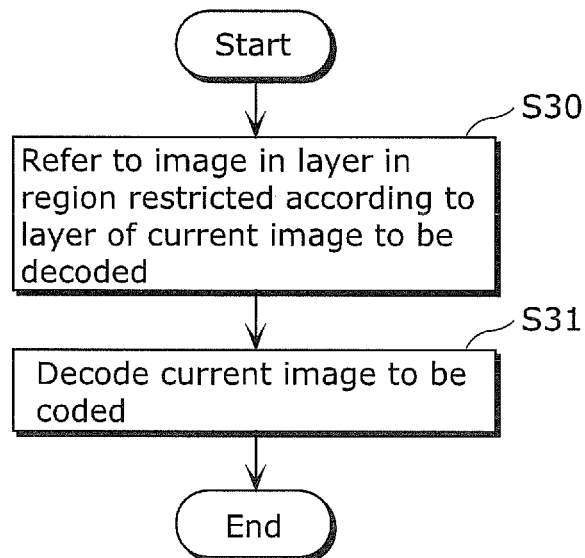
FIG. 10 is a flowchart illustrating processes performed by an image decoding apparatus 2000 according to Embodiment 1 of the present invention.

FIG. 10 is a flowchart illustrating processes performed by the image decoding apparatus 2000 according to the present embodiment.

The inter prediction unit 2108 of the image decoding apparatus 2000 refers, as a reference image for a current image to be decoded, to an image that belongs to the second layer in a range restricted according to the first layer to which the current image belongs (Step S30). Then, the image decoding apparatus 2000 decodes the current image based on the reference image (Step S31). It is to be noted that the inter prediction unit 2108 serves as a reference unit (the second reference unit) that refers to the reference image according to the present embodiment. In addition, one or more structural elements provided in the image decoding apparatus 2000 serve as decoding units that decode current image. In addition, the image is a picture, a slice, or the like.

For example, the inter prediction unit 2108 generates a reference list that indicates one or more pictures each of which belongs to a layer that is present in the same or lower level than the first layer, other than all of the pictures that belong to their respective layers present higher than the first layer, among the pictures included in the coded stream. Then, the inter prediction unit 2108, when referring to the reference picture in Step S30, selects a reference picture from the one or more pictures indicated in the reference list.

With this, the layer to which the reference image that is referred to for decoding of the current image belongs is present in a range restricted according to the first layer to which the current image belongs. Thus, since the reference image that is referred to for decoding of the current image is restricted according to the first layer, it is possible to reduce the processing load of the decoding.

Figure 11:
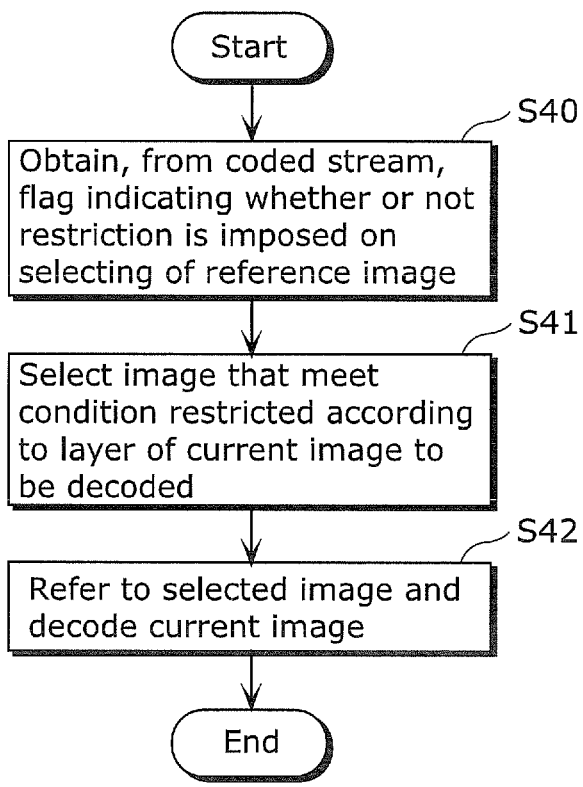
FIG. 11 is a flowchart illustrating processes using a flag, performed by the image decoding apparatus 2000 according to Embodiment 1 of the present invention.

FIG. 11 is a flowchart illustrating processes performed by the image decoding apparatus 2000 according to the present embodiment.

The inter prediction unit 2108 of the image decoding apparatus 2000 obtains, from a coded stream, a flag that indicates whether or not to impose a restriction on selecting of the reference image to be referred to for decoding the current image that is one of the images included in the coded stream (Step S40). Next, when the flag indicates that a restriction is imposed, the inter prediction unit 2108 selects, as a reference image for the current image, an image that meets the condition restricted according to the first layer to which the current image belongs (Step S41). Then, the image decoding apparatus 2000 decodes the current image based on the selected reference image (Step S42). It is to be noted that the inter prediction unit 2108 serves as a flag obtaining unit that obtains the flag and, at the same time, a selecting unit that selects a reference image.

With this, in the case where the flag indicates that a restriction is imposed, an image that meets the condition restricted according to the first layer to which the current image belongs is selected as a reference image. More specifically, a reference image that is referred to for decoding of the current image is restricted according to the first layer. As a result, it is possible to reduce the processing load of the decoding of the current image.

Figure 12:
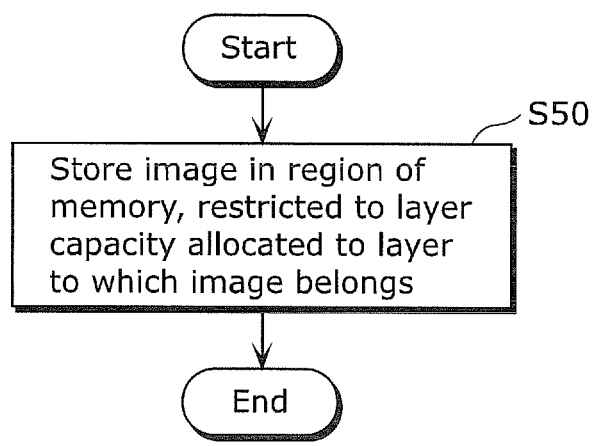
FIG. 12 is a flowchart illustrating a memory managing method according to Embodiment 1 of the present invention.

FIG. 12 is a flowchart illustrating a memory managing method according to the present embodiment.

The memory control unit 2200 of the image decoding apparatus 2000 stores a target image to be stored among the images included in the coded stream, in a region of the memory 2106, which is restricted to a layer capacity that is a capacity allocated to a layer to which the target image belongs (Step S50). More specifically, the memory control unit 2200 allocates, as a layer capacity, part of available memory capacity in the memory 2106, for each of the layers. It is to be noted that, according to the present embodiment, the memory control unit 2200 serves as the memory management apparatus and includes a storage control unit for storing the target image for storage described above.

There is a case, for example, where a long-time reference image that is referred to over a long period of time belongs to another layer, and the long-time reference image is stored in another region. In such a case, when the target image is stored in the other region, the long-time reference image might be deleted from the memory 2106 in some cases. It is therefore necessary to perform processing such as decoding of the long-time reference image again, in order to refer to the long-time reference image after the long-time reference image is deleted from the memory 2106. In view of the above, with the memory managing method according to the present embodiment, since a target image to be stored is stored in a region of a memory, which is restricted to a layer capacity that is allocated to the layer to which the target image belongs and restricted to a layer capacity, it is possible to prevent the long-time reference image from being deleted from the memory 2106. In other words, it is possible to store a necessary reference image in the memory 2106 without fail. As a result, it is possible to omit a redundant process such as decoding once again of the long-time reference image. In addition, it is possible to reduce processing load for successively applying a memory management command for instructing deleting of an unnecessary image in order to store a necessary reference image in the memory 2106 without fail.

It is to be noted that, in the case where the above-described region has no remaining capacity for storing a target image to be stored when storing the target image, the memory control unit 2200 deletes from the region, from among one or more existing images that have already been stored in the region, the existing image which has been stored earliest, such that the target image is stored.

According to the present embodiment, a layer to which a reference image that is an image to be referred to for coding or decoding of the current image to be processed, out of plural images included in the video signal (coded stream), is restricted to be a layer that is in the same as or lower level than the layer to which the current image belongs. In such a case, when allocating a layer capacity for each of the layers, the memory control unit 2200 allocates, to a lowest level layer 0 located at the bottom among the layers, a layer capacity larger than a layer capacity allocated to an upper level layer positioned higher than the lowest level layer 0.

With this, since the layer to which the reference image belongs is restricted to the layer in the same level as or lower level than the layer to which the current image belongs, it is highly likely that an image that belongs to the lowest level layer 0 is referred to for over a longer period of time than an image that belongs to the upper level layer. In view of the above, a layer capacity larger than a layer capacity allocated to the upper level layer is allocated to the lowest level layer 0 with the memory managing method according to the present embodiment, and thus it is possible to store, in the memory, the image that belongs to the lowest level layer 0 over a long period of time. As a result, when an image that belongs to the lowest level layer 0 is referred to, it is possible to prevent such a situation as that the image is deleted from the memory 2106 and thus cannot be referred to.

In addition, the memory control unit 2200 marks an attribute on the image, out of the images stored in the memory 2106, which belongs to a layer located above a layer to which the current image to be decoded belongs. For example, the memory control unit 2200 marks an attribute that indicates that the image is not used for reference. With this, since the attribute is marked on the image, it is possible to easily identify an unnecessary image which is not to be used for reference and to delete the image from the memory 2106 prior to deleting other images. As a result, it is possible to effectively utilize the capacity of the memory 2106.

Figure 13:
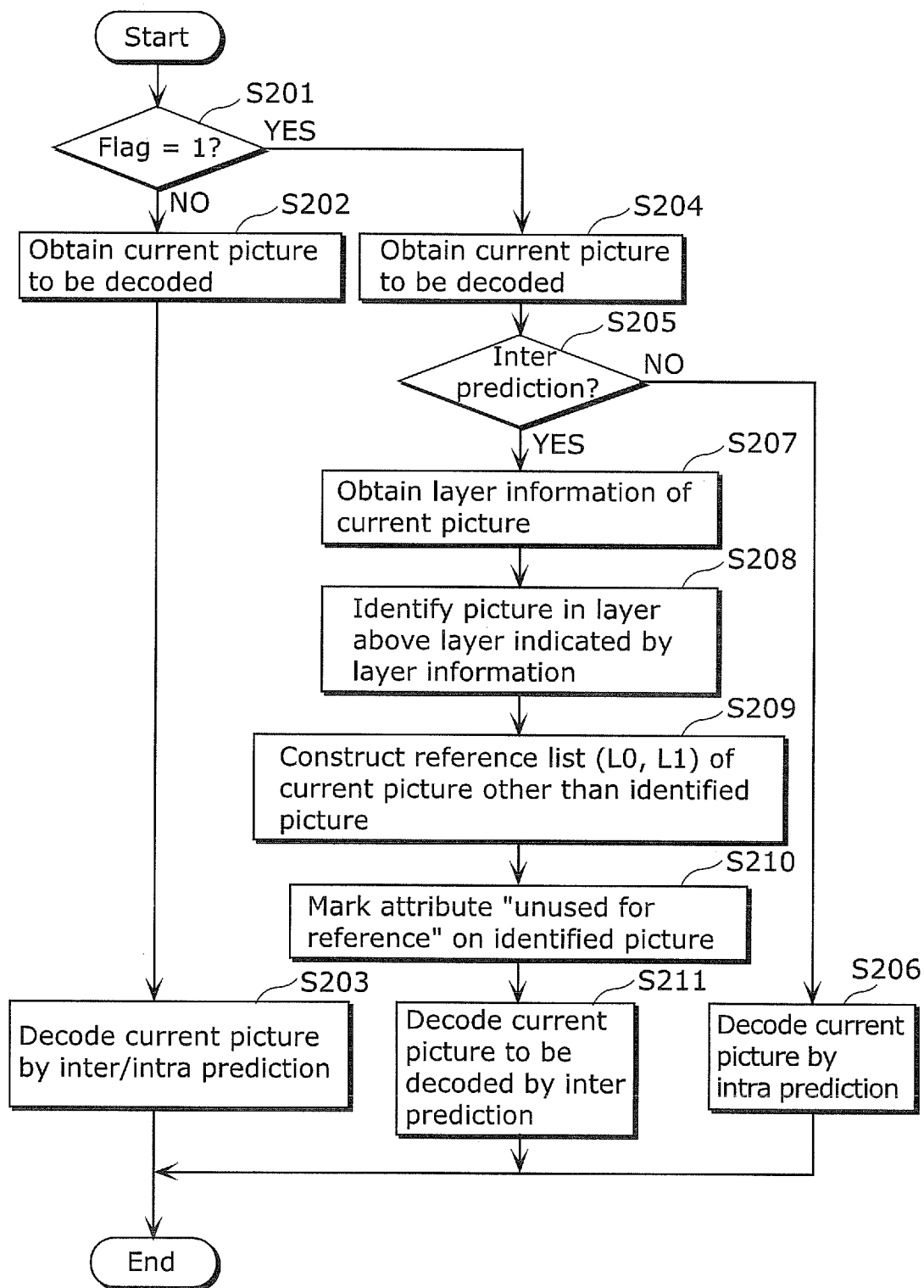
FIG. 13 is a flowchart illustrating specific processes performed by the image decoding apparatus 2000 according to Embodiment 1 of the present invention.

FIG. 13 is a flowchart illustrating specific processes performed by the image decoding apparatus 2000 according to the present embodiment.

First, the image decoding apparatus 2000 obtains a flag with one bit from a coded stream and determines whether or not the flag indicates 1 (Step S201).

When the image decoding apparatus 2000 determines that the flag does not indicate 1 (No in Step S201), the image decoding apparatus 2000 obtains a current picture to be decoded corresponding to the flag (Step S202), and decodes the current picture through a general method (for example, inter prediction or intra prediction according to H.264 standard) (Step S203).

On the other hand, when the image decoding apparatus 2000 determines that the flag indicates 1 (Yes in Step S201), the image decoding apparatus 2000 obtains a current picture to be decoded which corresponds to the flag (Step S204), and determines whether or not the current picture is a picture to be decoded through inter prediction (Step S205).

When the image decoding apparatus 2000 determines that the current picture is not a picture to be decoded through inter prediction (No in Step S205), the image decoding apparatus 2000 decodes the current picture through intra prediction (Step S206).

On the other hand, when the image decoding apparatus 2000 determines that the current picture is a picture to be decoded through inter prediction (Yes in Step S205), the image decoding apparatus 2000 obtains layer information of the current picture (Step S207). Then the inter prediction unit 2108 of the image decoding apparatus 2000 identifies the picture that belongs to a layer in a higher level than a layer indicated in the layer information (Step S208). Next, the inter prediction unit 2108 constructs a reference list (L0, L1) of the current picture using a picture other than the identified picture out of the pictures stored in the memory 2106 (Step S209).

In addition, the memory control unit 2200 of the image decoding apparatus 2000 marks an attribute that indicates "unused for reference" on the picture identified in Step S208 (Step S210). Then the inter prediction unit 2108 decodes the current picture through inter prediction using the reference picture indicated in the reference list constructed in Step S209 (Step S211).

In Step S210, the memory control unit 2200 marks the attribute of "unused for reference" on all of the reference pictures that belong to a layer in a higher level than a layer indicated by the layer information, out of the pictures (reference pictures) held in the memory 2106. This allows the image decoding apparatus 2000 to know in advance that the constraint condition that a picture that belongs to a layer in a higher level than a layer of the current picture is not allowed to be referred to is attached to the coded stream.

As described above, according to the present embodiment, it is possible to mark the attribute "unused for reference" on a reference picture that is certainly not to be used for reference, through the third method (a method based on a layer structure) different from the general FIFO management and the adaptive memory control using MMCO. This makes it possible, when the reference picture is output (displayed), to delete automatically the reference picture from the memory 210.

In addition, the image decoding apparatus 2000, in constructing the reference list in Step S209 (sorting process at the time of initialization of the reference list), generates or updates the reference list of a current picture to be decoded (or a current slice to be decoded), excepting the reference picture in a layer of a higher level than a layer of the current picture, from the reference list. This allows facilitating of the constructing process of the reference list.

(Modification)

Figure 14:
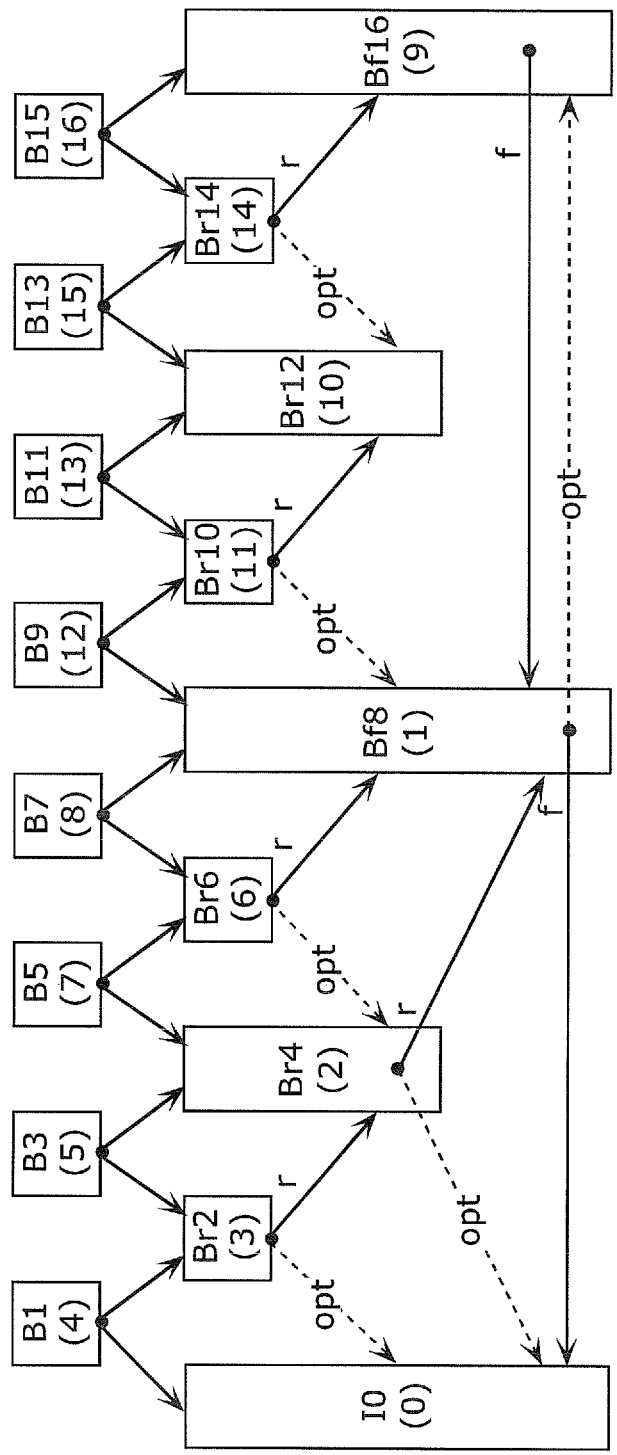
FIG. 14 is a diagram illustrating a reference structure according to a modification example of Embodiment 1 of the present invention.
Figure 15:
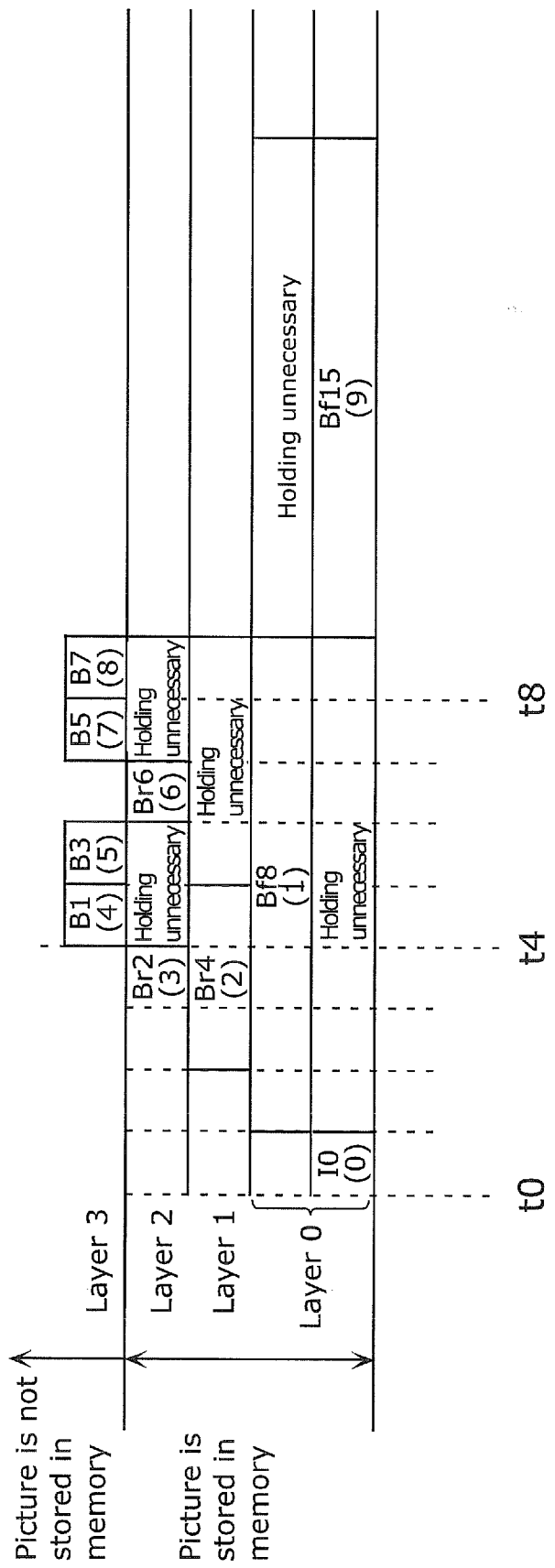
FIG. 15 is a diagram illustrating an example of the memory managing method according to a modification example of Embodiment 1 of the present invention.
Figure 16:
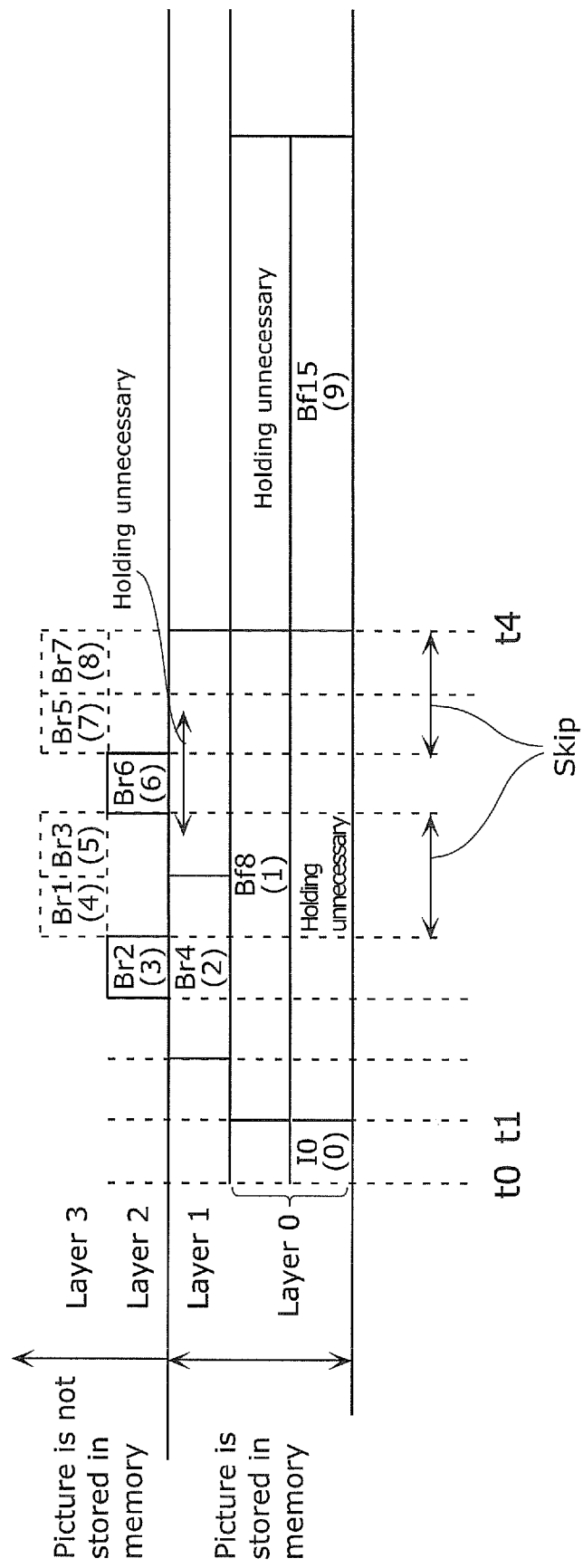
FIG. 16 is a diagram illustrating another example of the memory managing method according to Modification 1 of the embodiment of the present invention.

It is to be noted that, in the present embodiment, reference to a picture and memory management illustrated in FIG. 14, FIG. 15, and FIG. 16 may be performed.

FIG. 14 is a diagram that indicates a reference structure according to the present modification. It is to be noted that, in FIG. 14, an alphabet, a numeric character, and a numeric character provided in parentheses, which are added to a picture indicate a picture type, a display order of the picture, and a coding order of the picture, respectively. I0(0) indicates the picture type "I", a display order "0" of the picture, and the coding order "0" of the picture. The Br2(3) indicates the picture type "B", a display order "2" of the picture, and the coding order "3" of the picture.

For example, with the reference structure according to the present modification, a preceding picture in the display order is referred to in coding or decoding of each of the picture Bf8(1) and the picture Bf16(9) which are the B-pictures that belong to the layer 0 in the lowest level, as shown by solid arrows each denoted by fin FIG. 14. In addition, in coding or decoding a picture that belongs to a layer in a higher level than the layer 0 and in a lower level than the layer 3 of the highest level, such as the picture Br2(3) that belong to the layer 2, a following picture in the display order is referred to as shown by the solid arrows each denoted by r in FIG. 14.

As described above, the image coding apparatus 1000 and the image decoding apparatus 2000 according to the present modification, in order to code or decode a B-picture, may refer as a reference picture only to a picture present in a single direction (backward or forward) with respect to the B-picture in the display order. In this case, the image coding apparatus 1000 may include, in a coded stream, a unidirectional flag that indicates whether or not reference is restricted to only the single direction. Here, the unidirectional flag indicates: whether or not reference is allowed only to preceding pictures and not to following pictures in the layer 0; and whether or not reference is allowed only to following pictures and not to preceding pictures in the layers 1 and 2. As described above, the unidirectional flag indicates whether or not a restriction is imposed on reference in terms of the layer structure. In addition, the image coding apparatus 1000 includes such a unidirectional flag into the coded stream for each predetermined unit such as a sequence in the coded stream. The image decoding apparatus 2000 obtains the unidirectional flag included in the coded stream, and decodes a current picture to be decoded with reference only to a picture present in a single direction (backward or forward) according to the layer of the current picture in the case where the single direction flag indicates a reference restriction.

It is to be noted that the image decoding apparatus 2000, even when the unidirectional flag indicates a reference restriction, may refer to a picture in a direction other than the single direction as shown by dotted arrows denote by opt meaning option in FIG. 14 when the picture in the direction other than the single direction can be used. In addition, the image coding apparatus 1000 may indicate a picture in the single direction with a picture type. In this case, the image coding apparatus 1000 includes the picture type into the coded stream, and the image decoding apparatus 2000 refers, as a reference picture, to a picture in the single direction based on the picture type included in the coded stream. In addition, when the layer information is included in the coded stream, the image decoding apparatus 2000 deallocates the memory 2106 based on the layer information.

FIG. 15 is a diagram that indicates an example of the memory managing method according to the present modification.

The image decoding apparatus 2000, when performing 1-time speed reproduction (normal reproduction) on a coded stream having the reference structure shown in FIG. 14, decodes a picture that belongs to each of the layers 0, 1, 2, and 3. In this case, after decoding the pictures that belong to their respective layers 0, 1, and 2, the image decoding apparatus 2000 stores these pictures into the memory 2106 as reference pictures. On the other hand, even after decoding the pictures that belong to the layer 3, the image decoding apparatus 2000 does not store these pictures into the memory 2106 as reference pictures. Otherwise, even when the pictures that belong to the layer 3 are stored in the memory 2106, the memory control unit 2200 marks an attribute "unused for reference" on these pictures upon storing of these pictures.

FIG. 16 is a diagram that indicates another example of the memory managing method according to the present modification.

The image decoding apparatus 2000, when performing fast-forward reproduction on a coded stream having the reference structure shown in FIG. 14, decodes a picture that belongs to each of the layers 0, 1, and 2 excepting the layer 3. More specifically, decoding or reproduction of the pictures Br1(4), Br3(5), Br5(7), and Br7(8) are skipped. In this case, after decoding the pictures that belong to their respective layers 0 and 1, the image decoding apparatus 2000 stores these pictures into the memory 2106 as reference pictures. On other hand, even after decoding the pictures that belong to the layer 2, the image decoding apparatus 2000 does not store these pictures into the memory 2106 as reference pictures. Otherwise, even when the pictures that belong to the layer 2 are stored in the memory 2106, the memory control unit 2200 marks an attribute "unused for reference" on these pictures upon storing of these pictures.

It is possible to reduce the processing load of coding or decoding with the method of referring to a picture and the memory managing method according to the present modification as well.

(Embodiment 2)

The processing described in the aforementioned Embodiment can be simply implemented in an independent computer system, by recording, in a recording medium, a program for implementing the configurations of the video coding method (image coding method) and the video decoding method (image decoding method) described in the aforementioned Embodiment. The recording media may be any recording media as long as a program can be recorded, such as a magnetic disk, an optical disk, a magnetic optical disk, an IC card, and a semiconductor memory.

Hereinafter, the applications to the video coding method (image coding method) and the video decoding method (image decoding method) described in the aforementioned Embodiment and systems using thereof will be described. The system is characterized by including an image coding and decoding apparatus that includes an image coding apparatus that uses the image coding method and an image decoding apparatus that uses the image decoding method. Other configurations in the system may be appropriately changed depending on cases.

Figure 17:
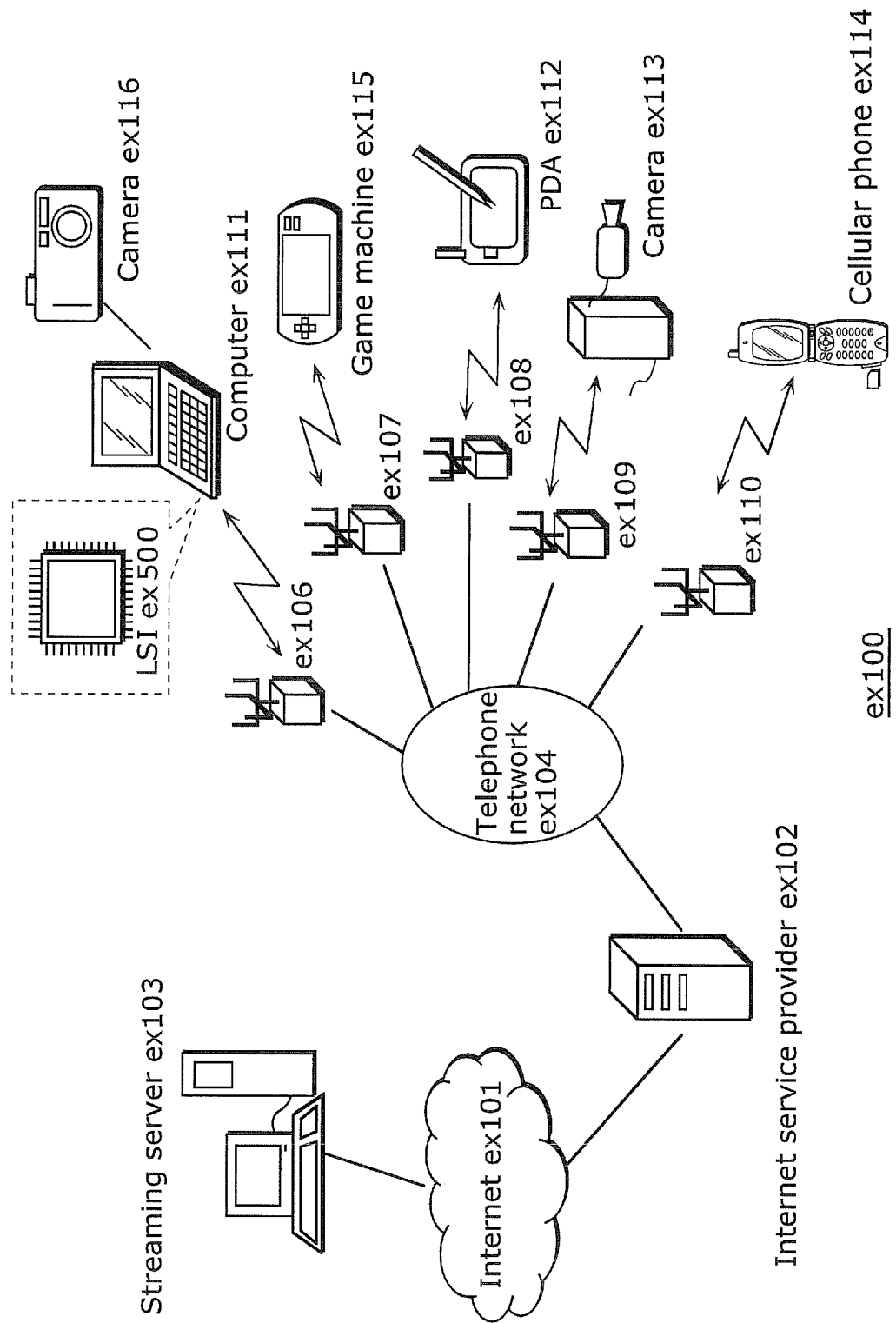
FIG. 17 illustrates an overall configuration of a content providing system ex100 for implementing content distribution services.

FIG. 17 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells. The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 17, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital video camera, is capable of capturing both still images and video. Furthermore, the cellular phone ex114 may be the one that meets any of the standards such as Global System for Mobile Communications (GSM®), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of Embodiments (this means that the camera ex113 serves as the image coding apparatus according to the present invention), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (this means that the each of the devices serves as the image decoding apparatus according to the present invention).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, a hard disk) that is readable by the computer ex111 and others, and the coding and decoding processes may be performed using the software. Furthermore, when the cellular phone ex114 is equipped with a camera, the image data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 18:
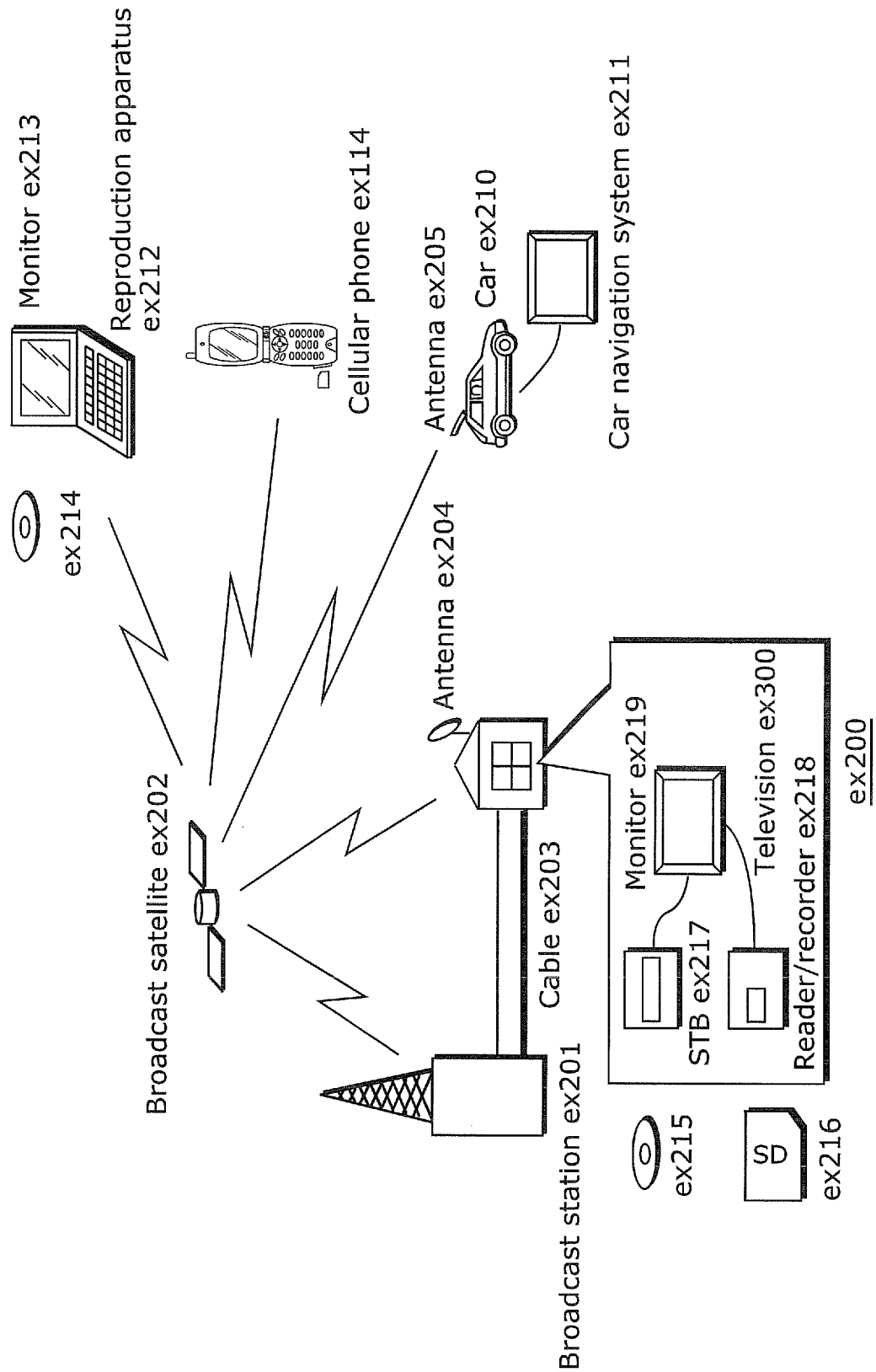
FIG. 18 is an overall configuration of a digital broadcasting system.

Aside from the example of the content providing system ex100, at least one of the video coding apparatus (image coding apparatus) and the video decoding apparatus (image decoding apparatus) described in each of Embodiments may be implemented in a digital broadcasting system ex200 illustrated in FIG. 18. More specifically, a broadcast station ex201 communicates or transmits, via radio waves to a broadcast satellite ex202, multiplexed data obtained by multiplexing audio data and others onto video data. The video data is data coded by the video coding method described in the aforementioned Embodiment (in other words, data coded by the image coding apparatus according to the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data and reproduces the decoded data (this means the device serves as the image decoding apparatus according to the present invention).

Furthermore, a reader/recorder ex218 that (i) reads and decodes the multiplexed data recorded on a recording media ex215, such as a DVD and a BD, or (i) codes video signals in the recording medium ex215, and in some cases, writes data obtained by multiplexing an audio signal on the coded data can include the video decoding apparatus or the video coding apparatus as shown in the aforementioned Embodiment. In this case, the reproduced video signals are displayed on the monitor ex219, and can be reproduced by another device or system using the recording medium ex215 on which the multiplexed data is recorded. It is also possible to implement the video decoding apparatus in the set top box ex217 connected to the cable ex203 for a cable television or to the antenna ex204 for satellite and/or terrestrial broadcasting, so as to display the video signals on the monitor ex219 of the television ex300. The video decoding apparatus may be implemented not in the set top box but in the television ex300.

Figure 19:
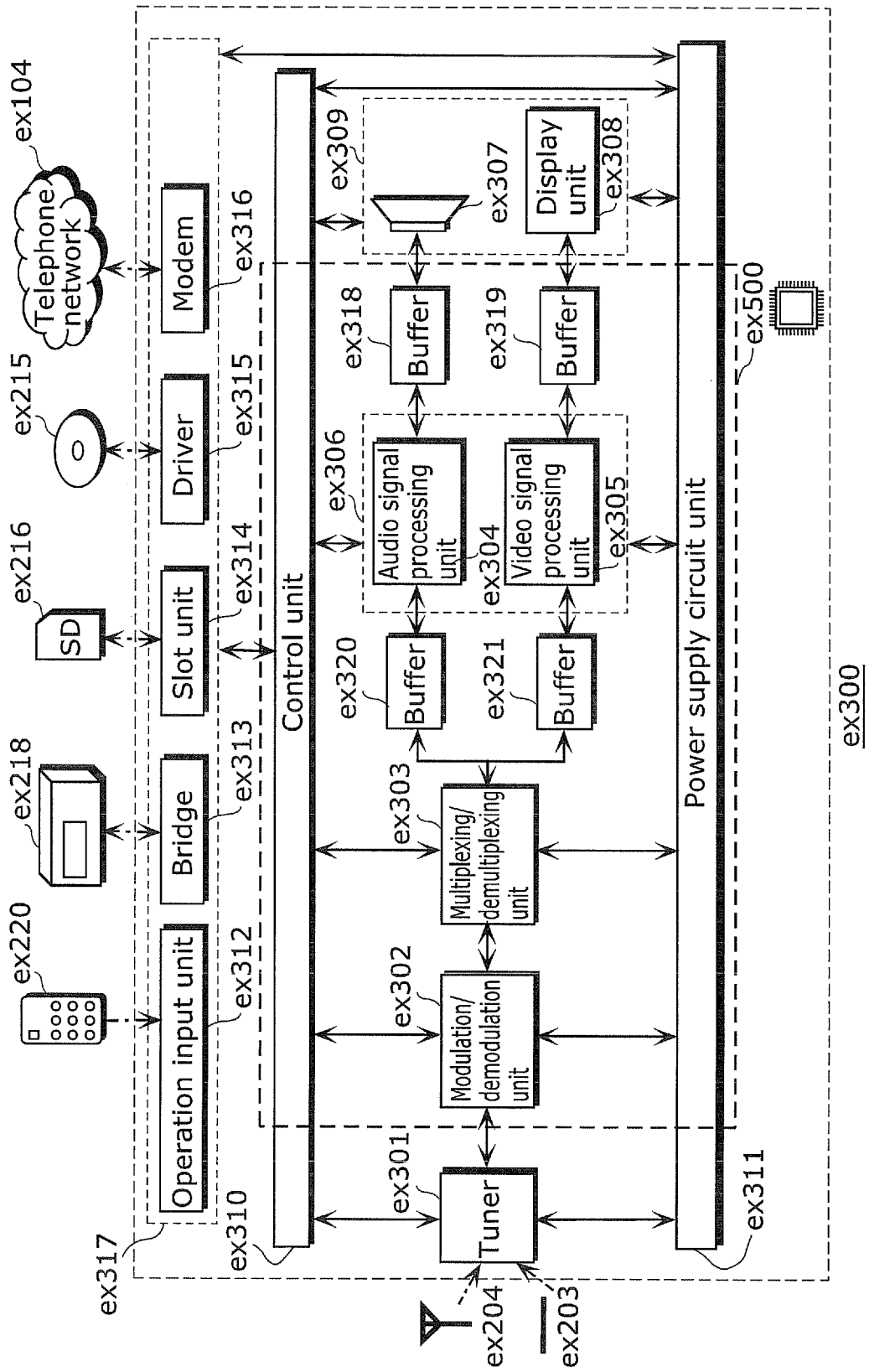
FIG. 19 is a block diagram illustrating an example of a configuration of a television.

FIG. 19 illustrates the television (receiver) ex300 that uses the video coding method and the video decoding method described in the aforementioned Embodiment. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 (which serve as the image coding apparatus or the image decoding apparatus according to the present invention) that decode audio data and video data and code audio data and video data, respectively; a speaker ex307 that provides the decoded audio signal; and an output unit ex309 including a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation from a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in the aforementioned Embodiment, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and an SD card. Next, a configuration in which the television ex300 codes an audio signal and a video signal, and transmits the data outside or writes the data on a recording medium will be described. In the television ex300, upon a user operation from the remote controller ex220 and others, the audio signal processing unit ex304 codes an audio signal, and the video signal processing unit ex305 codes a video signal, under control of the control unit ex310 using the coding method described in the aforementioned Embodiment. The multiplexing/demultiplexing unit ex303 multiplexes the coded video signal and audio signal, and provides the resulting signals outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example. Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 20:
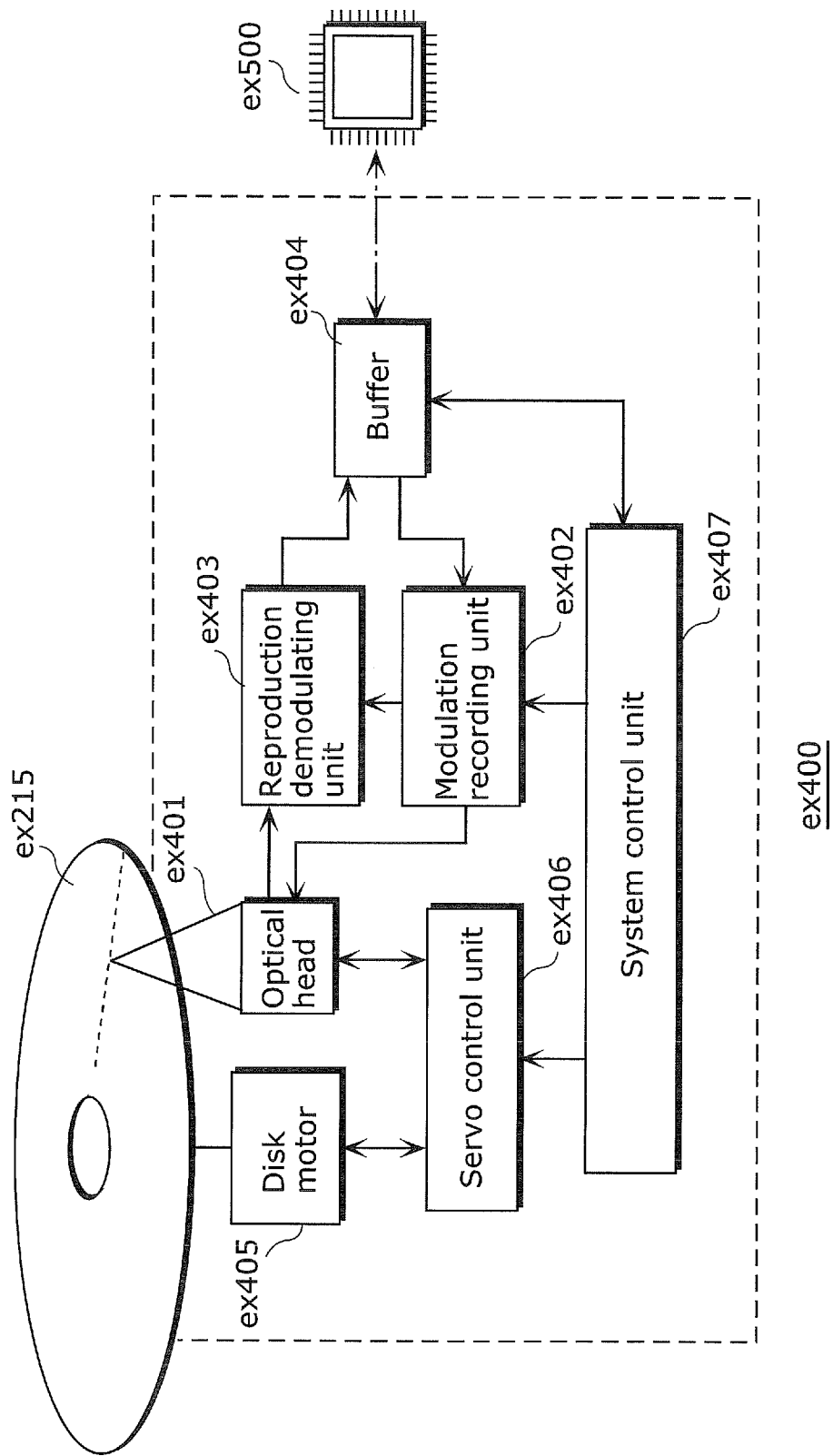
FIG. 20 is a block diagram illustrating an example of a configuration of an information reproducing/recording unit that reads and writes information from or on a recording medium that is an optical disk.

As an example, FIG. 20 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 21:
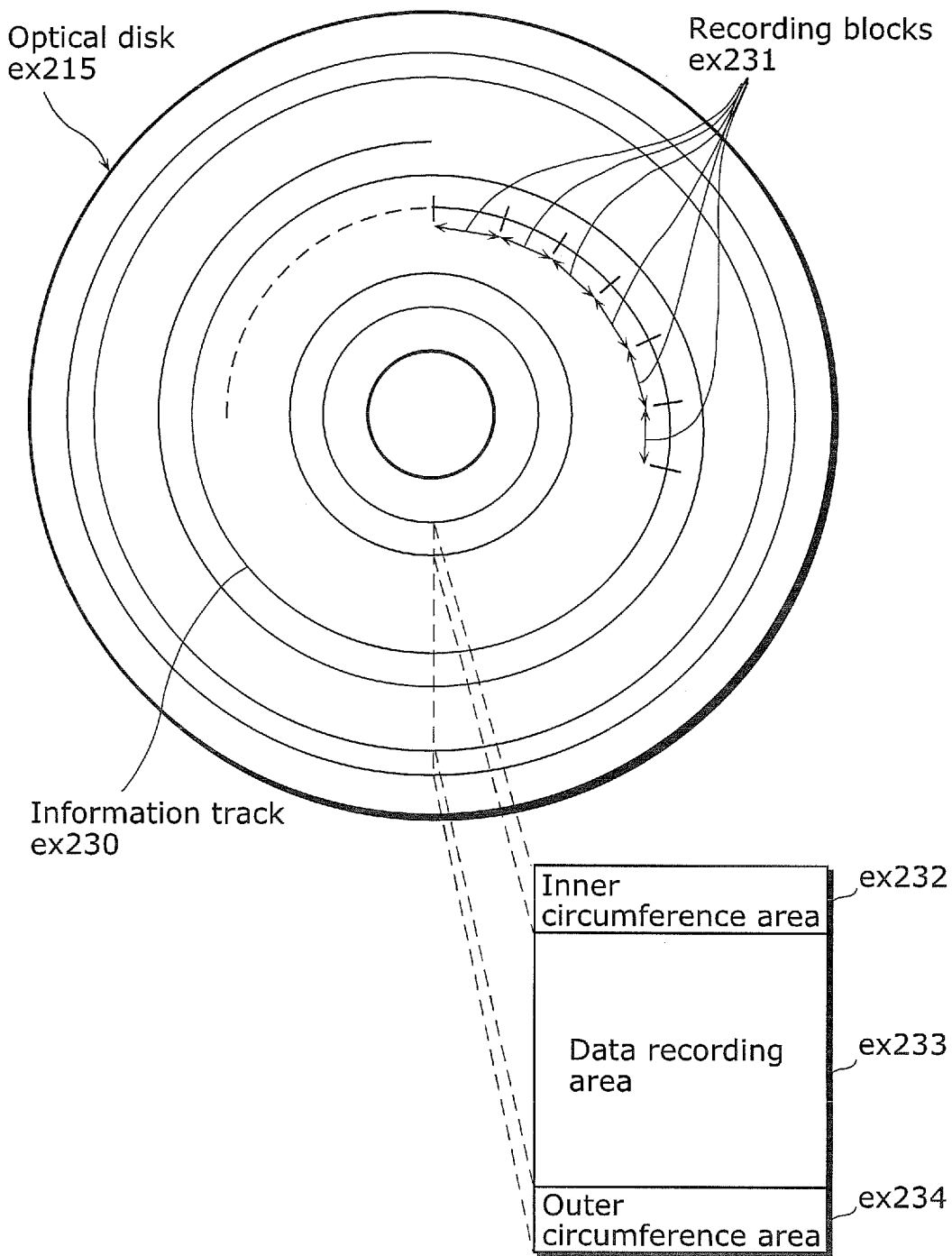
FIG. 21 is a drawing showing an example of a configuration of a recording medium that is an optical disk.

FIG. 21 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215. Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 19. The same will be true for the configuration of the computer ex111, the cellular phone ex114, and others.

Figure 22A:
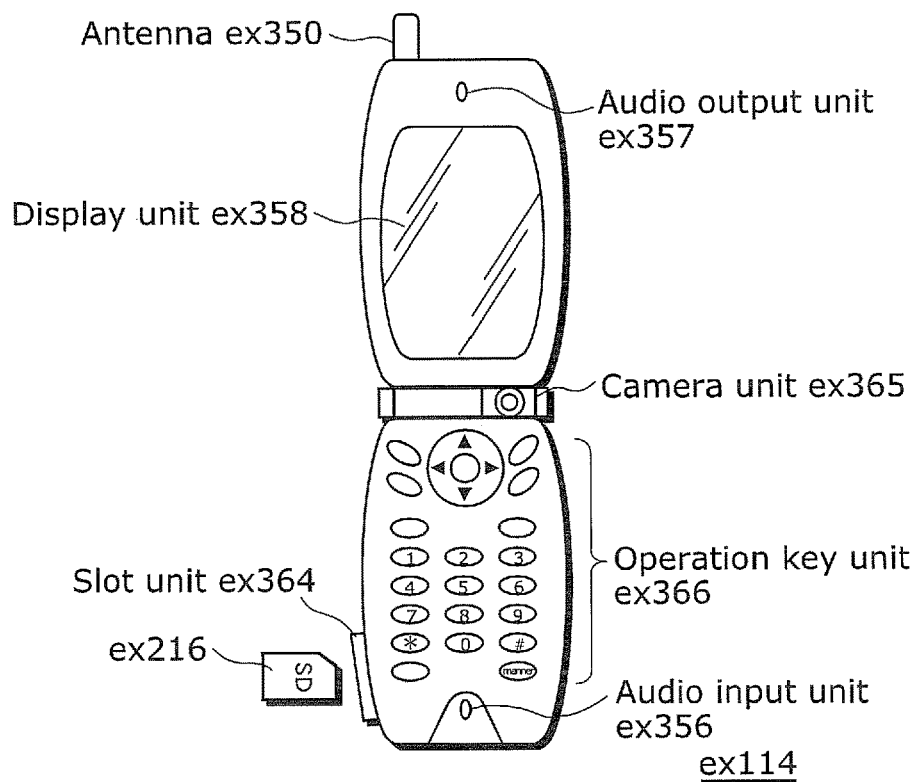
FIG. 22A is an example of a cellular phone.

FIG. 22A illustrates the cellular phone ex114 that uses the video coding method and the video decoding method described in the aforementioned Embodiment. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including a set of operation keys ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 22B:
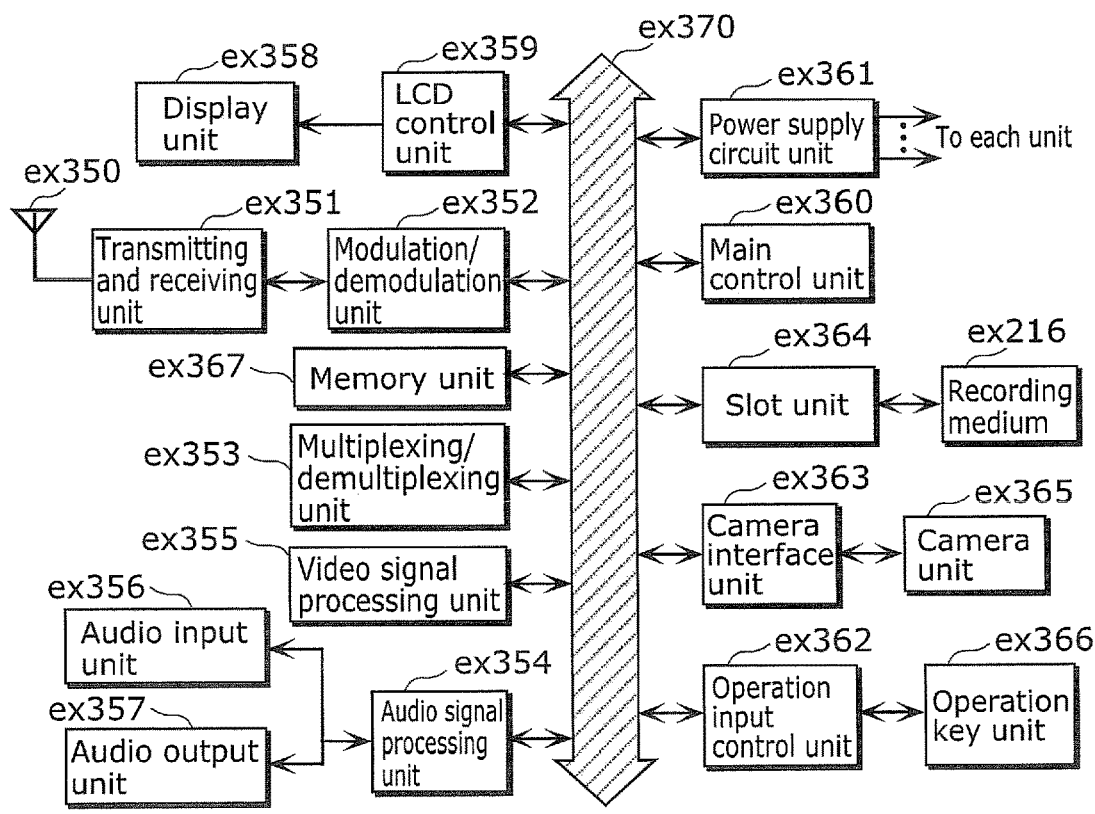
FIG. 22B is an example of a configuration of the cellular phone.

Next, an example of a configuration of the cellular phone ex114 will be described with reference to FIG. 22B. In the cellular phone ex114, a main control unit ex360 designed to control overall each unit of the main body including the display unit ex358 as well as the operation keys ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114. In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350 Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation keys ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the video coding method shown in the aforementioned Embodiment (that means that the video signal processing unit ex355 serves as the image coding apparatus according to the present invention), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a video decoding method corresponding to the coding method shown in each of Embodiments, and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio. Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the video coding method and the video decoding method in the aforementioned Embodiment can be used in any of the devices and systems described. Thus, the advantages described in the aforementioned Embodiment can be obtained.

Furthermore, the present invention is not limited to the aforementioned Embodiment, and various modifications and revisions are possible without departing from the scope of the present invention.

(Embodiment 3)

Video data can be generated by switching, as necessary, between (i) the video coding method or the video coding apparatus shown in each of Embodiments and (ii) a video coding method or a video coding apparatus in conformity with a different standard, such as MPEG-2, MPEG4-AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the video coding method and by the video coding apparatus shown in each of Embodiments will be hereinafter described. The multiplexed data is a digital stream in the MPEG2-Transport Stream format.

FIG. 23 illustrates a structure of the multiplexed data. As illustrated in FIG. 23, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the main video. Furthermore, the interactive graphics stream represents an interactive screen to be generated by arranging the GUI components on a screen. The video stream is coded in the video coding method or by the video coding apparatus shown in each of Embodiments, or in a video coding method or by a video coding apparatus in conformity with a conventional standard, such as MPEG-2, MPEG4-AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary video to be mixed with the primary audio.

Figure 24:
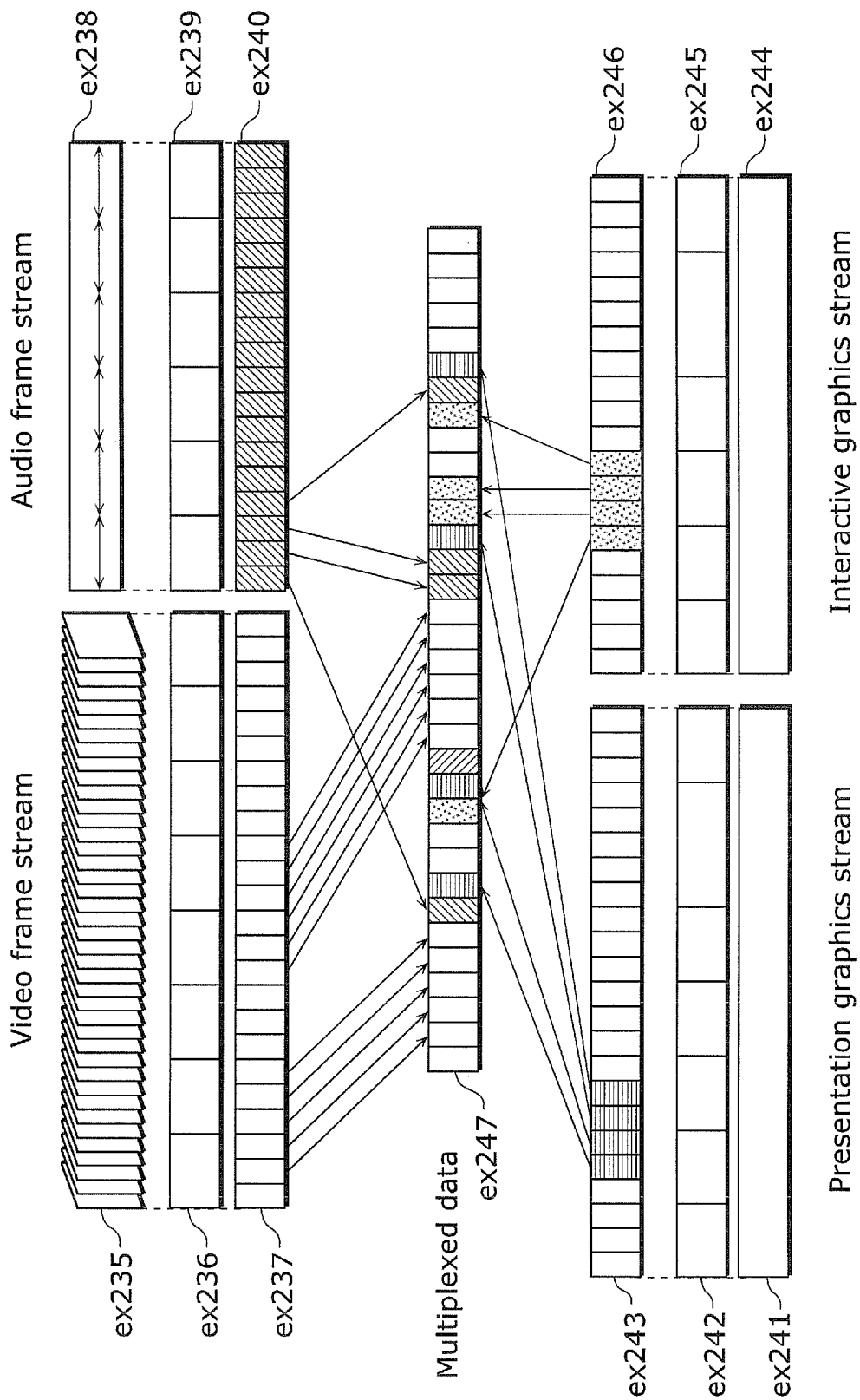
FIG. 24 is a drawing schematically illustrating how each of the streams is multiplexed in multiplexed data.

FIG. 24 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 25:
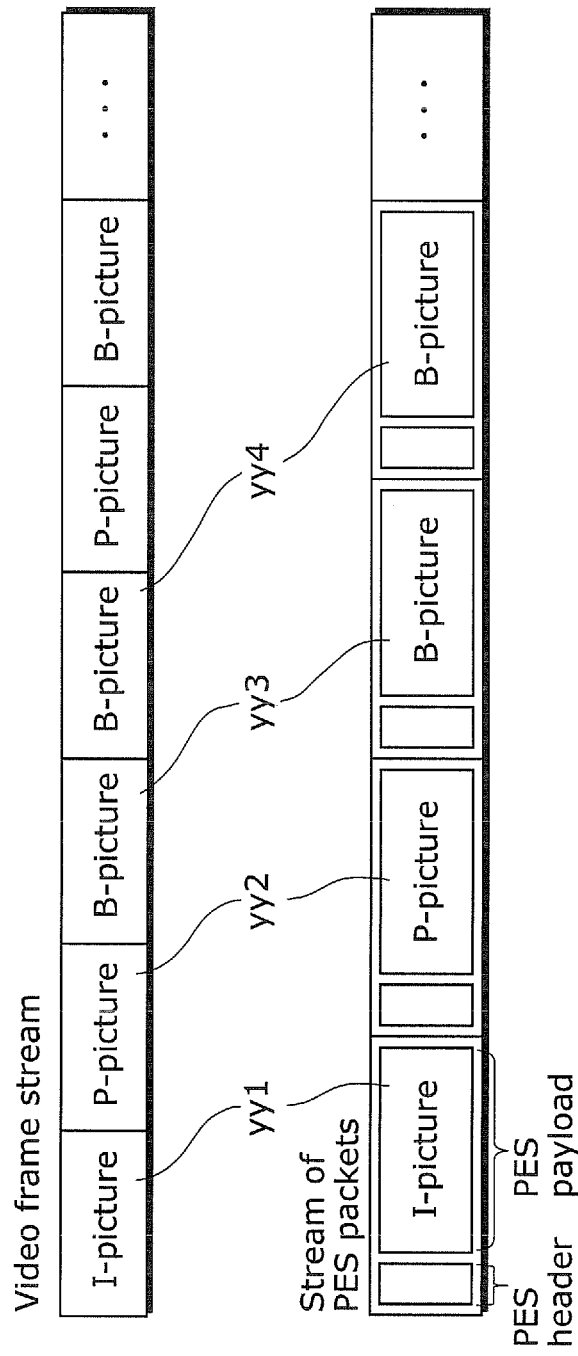
FIG. 25 is a drawing illustrating how a video stream is stored in a stream of PES packets in more detail.

FIG. 25 illustrates how a video stream is stored in a stream of PES packets in more detail. The first bar in FIG. 25 shows a video frame stream in a video stream. The second bar shows the stream of PES packets. As indicated by arrows denoted as yy2, yy2, yy3, and yy4 in FIG. 25, the video stream is divided into pictures as I-pictures, B-pictures, and P-pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 26 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 26. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

FIG. 27 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

Figure 28:
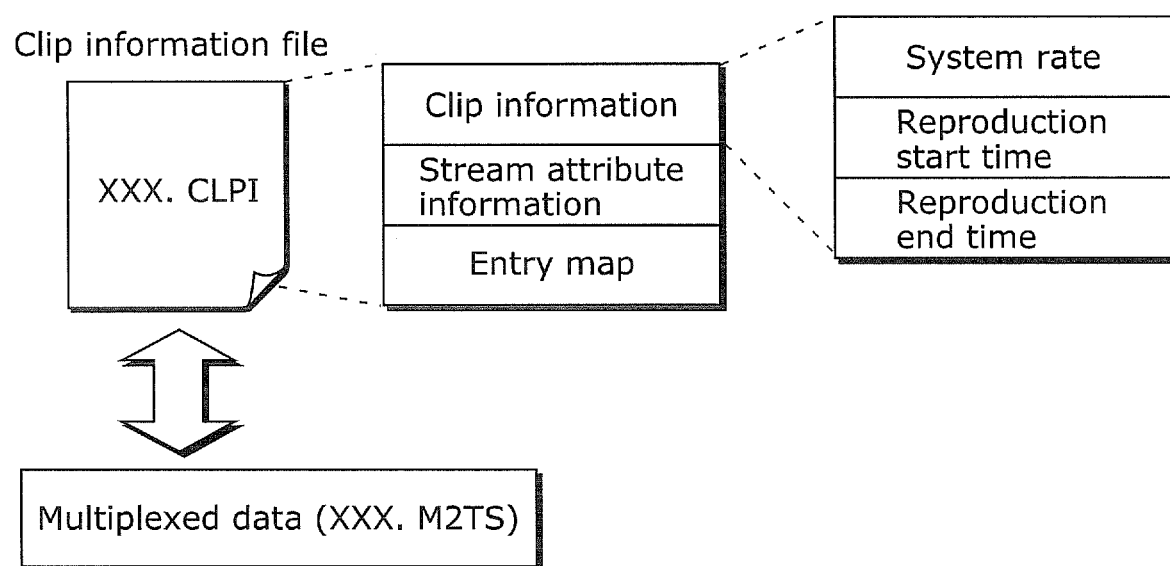
FIG. 28 illustrates an internal structure of multiplexed data information.

When the multiplexed data is recorded on a recording medium and others, it is recorded together with multiplexed data information files. Each of the multiplexed data information files is management information of the multiplexed data as shown in FIG. 28. The multiplexed data information files are in one to one correspondence with the multiplexed data, and each of the files includes multiplexed data information, stream attribute information, and an entry map. As illustrated in FIG. 28, the multiplexed data includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 29:
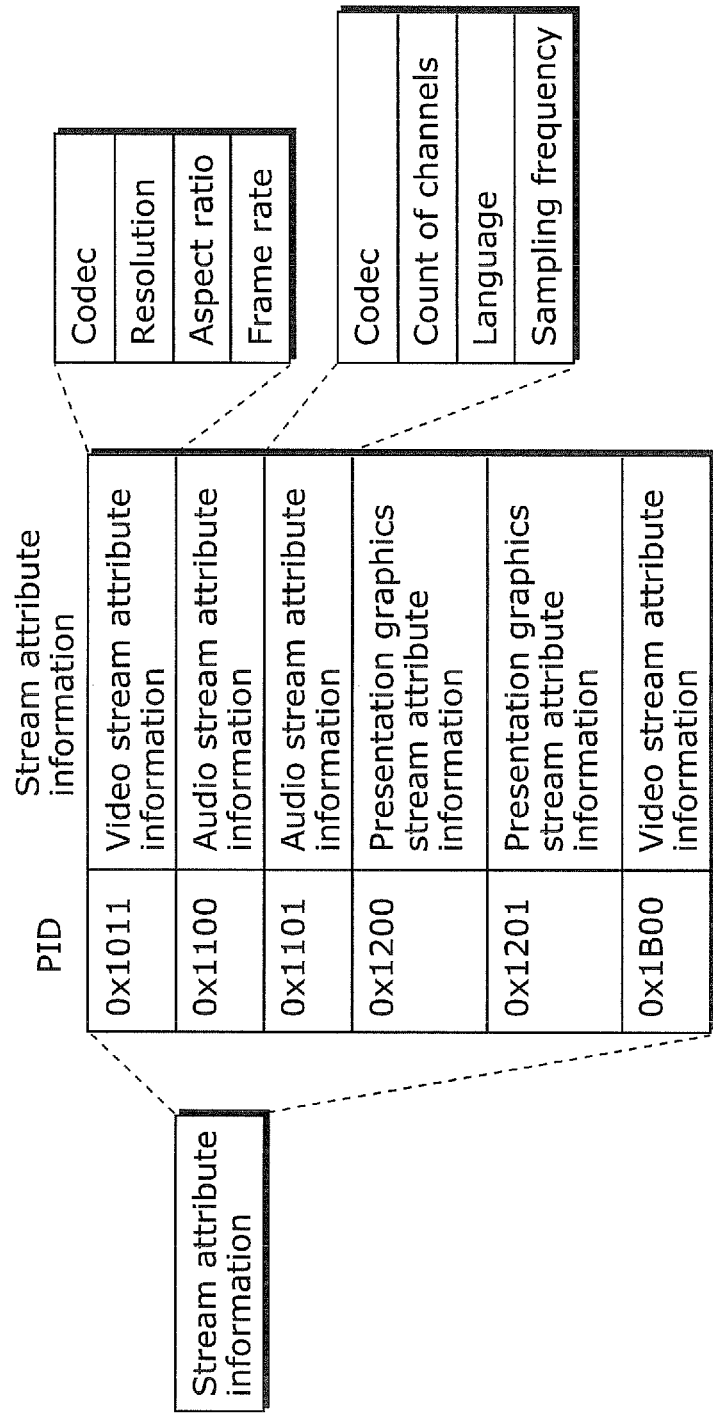
FIG. 29 is a drawing showing an internal structure of stream attribute information.

As shown in FIG. 29, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the video coding method or the video coding apparatus described in each of Embodiments includes a step or a unit for allocating unique information indicating video data generated by the video coding method or the video coding apparatus in each of Embodiments, to the stream type included in the PMT or the video stream attribute information. With the configuration, the video data generated by the video coding method or the video coding apparatus described in each of Embodiments can be distinguished from video data that conforms to another standard.

Figure 30:
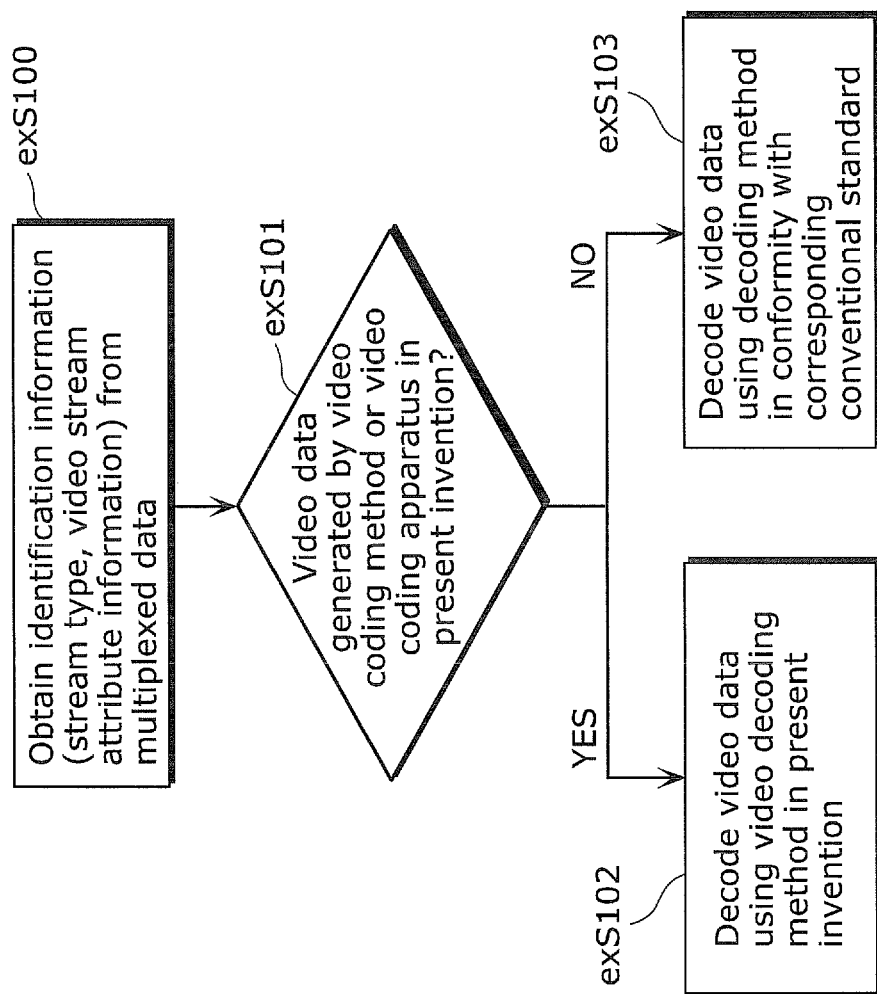
FIG. 30 is a drawing showing steps for identifying video data.

Furthermore, FIG. 30 illustrates steps of the video decoding method according to Embodiment 9. In Step exS100, the stream type included in the PMT or the video stream attribute information is obtained from the multiplexed data. Next, in Step exS101, it is determined whether or not the stream type or the video stream attribute information indicates that the multiplexed data is generated by the video coding method or the video coding apparatus in each of Embodiments. When it is determined that the stream type or the video stream attribute information indicates that the multiplexed data is generated by the video coding method or the video coding apparatus in each of Embodiments, in Step exS102, the stream type or the video stream attribute information is decoded by the video decoding method in each of Embodiments. Furthermore, when the stream type or the video stream attribute information indicates conformance to the conventional standards, such as MPEG-2, MPEG4-AVC, and VC-1, in Step exS103, the stream type or the video stream attribute information is decoded by a video decoding method in conformity with the conventional standards.

As such, allocating a new unique value to the stream type or the video stream attribute information enables determination whether or not the video decoding method or the video decoding apparatus that is described in each of Embodiments can perform decoding. Even when multiplexed data that conforms to a different standard, an appropriate decoding method or apparatus can be selected. Thus, it becomes possible to decode information without any error. Furthermore, the video coding method or apparatus, or the video decoding method or apparatus in this Embodiment can be used in the devices and systems described above.

(Embodiment 4)

Figure 31:
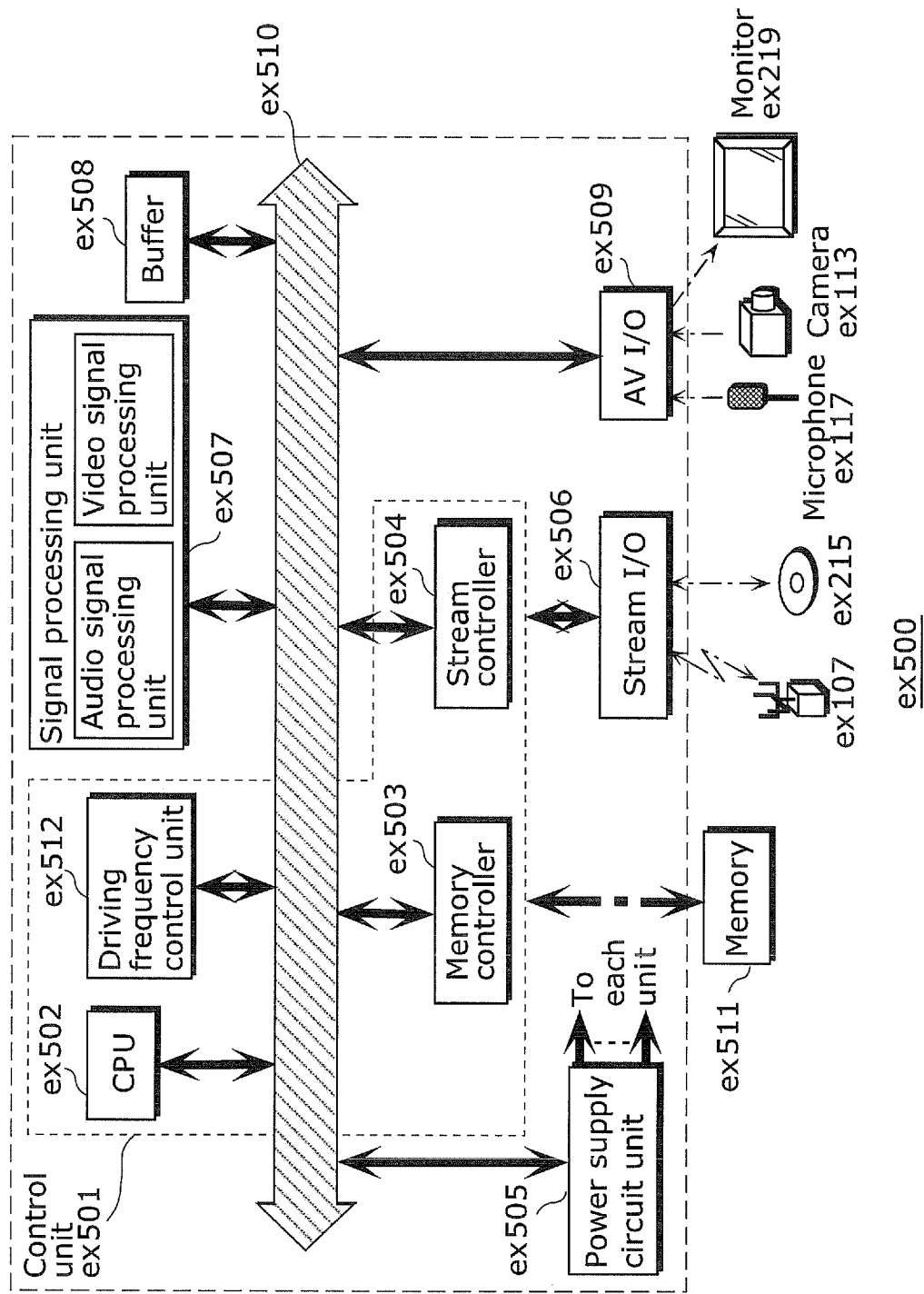
FIG. 31 is a block diagram illustrating an example of a configuration of an integrated circuit for implementing the video coding method and the video decoding method according to each of Embodiments.

Each of the video coding method, the video coding apparatus, the video decoding method, and the video decoding apparatus in each of Embodiments is typically achieved in the form of an integrated circuit or a Large Scale Integrated (LSI) circuit. As an example of the LSI, FIG. 31 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of Embodiments. Furthermore, the signal processing unit ex507 sometimes multiplexes the coded audio data and the coded video data, and a stream JO ex506 provides the multiplexed data outside. The provided multiplexed data is transmitted to a base station ex107, or written on the recording media ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration. Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

(Embodiment 5)

When video data is decoded in the video coding method or by the video coding apparatus described in each of Embodiments, compared to when video data that conforms to a conventional standard, such as MPEG-2, MPEG4-AVC, and VC-1, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 32:
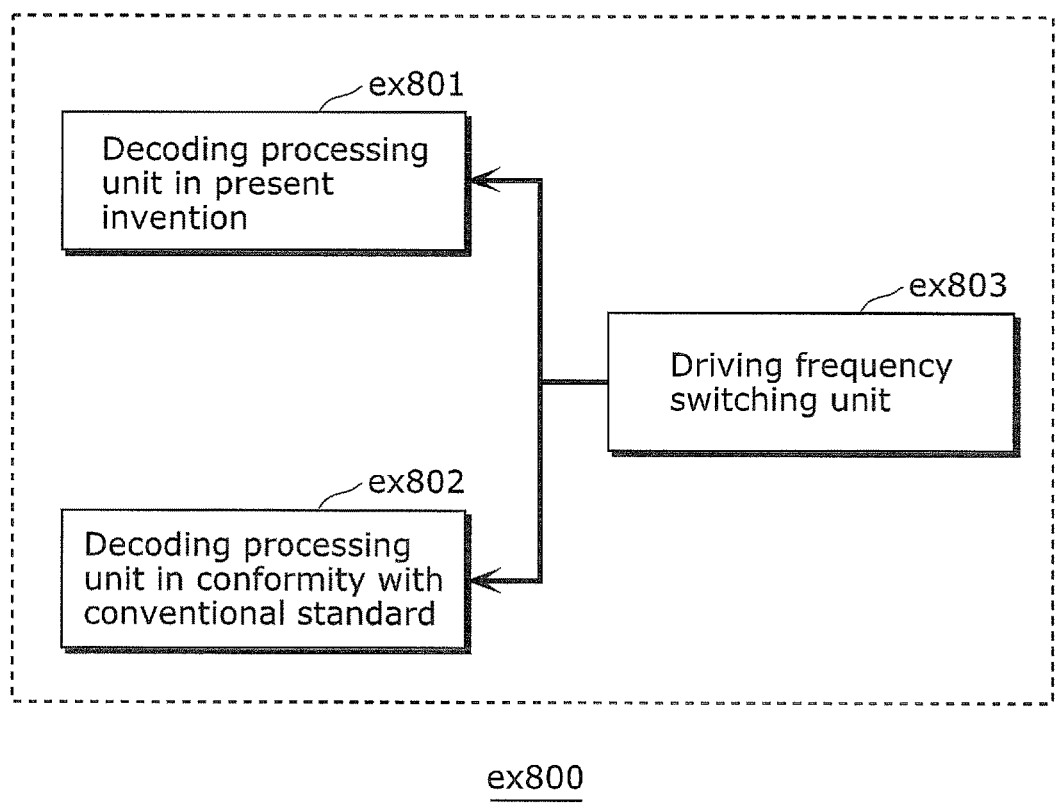
FIG. 32 is a drawing showing a configuration for switching between driving frequencies.

In order to solve the problem, the video decoding apparatus, such as the television ex300 and the LSI ex500 is configured to determine to which standard the video data conforms, and switch between the driving frequencies according to the determined standard. FIG. 32 illustrates a configuration ex800 in the present embodiment. A driving frequency switching unit ex803 sets a driving frequency to a higher driving frequency when video data is generated by the video coding method or the video coding apparatus described in each of Embodiments. Then, the driving frequency switching unit ex803 instructs a decoding processing unit ex801 that executes the video decoding method described in each of Embodiments to decode the video data. When the video data conforms to the conventional standard, the driving frequency switching unit ex803 sets a driving frequency to a lower driving frequency than that of the video data generated by the video coding method or the video coding apparatus described in each of Embodiments. Then, the driving frequency switching unit ex803 instructs the decoding processing unit ex802 that conforms to the conventional standard to decode the video data. More specifically, the driving frequency switching unit ex803 includes the CPU ex502 and the driving frequency control unit ex512 in FIG. 31. Here, each of the decoding processing unit ex801 that executes the video decoding method described in each of Embodiments and the decoding processing unit ex802 that conforms to the conventional standard corresponds to the signal processing unit ex507 in FIG. 31. The CPU ex502 determines to which standard the video data conforms. Then, the driving frequency control unit ex512 determines a driving frequency based on a signal from the CPU ex502.

Furthermore, the signal processing unit ex507 decodes the video data based on a signal from the CPU ex502. For example, the identification information described in Embodiment 3 is probably used for identifying the video data. The identification information is not limited to the one described in Embodiment 3 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 34. The driving frequency can be selected by storing the look-up table in the buffer ex508 and an internal memory of an LSI and with reference to the look-up table by the CPU ex502.

Figure 33:
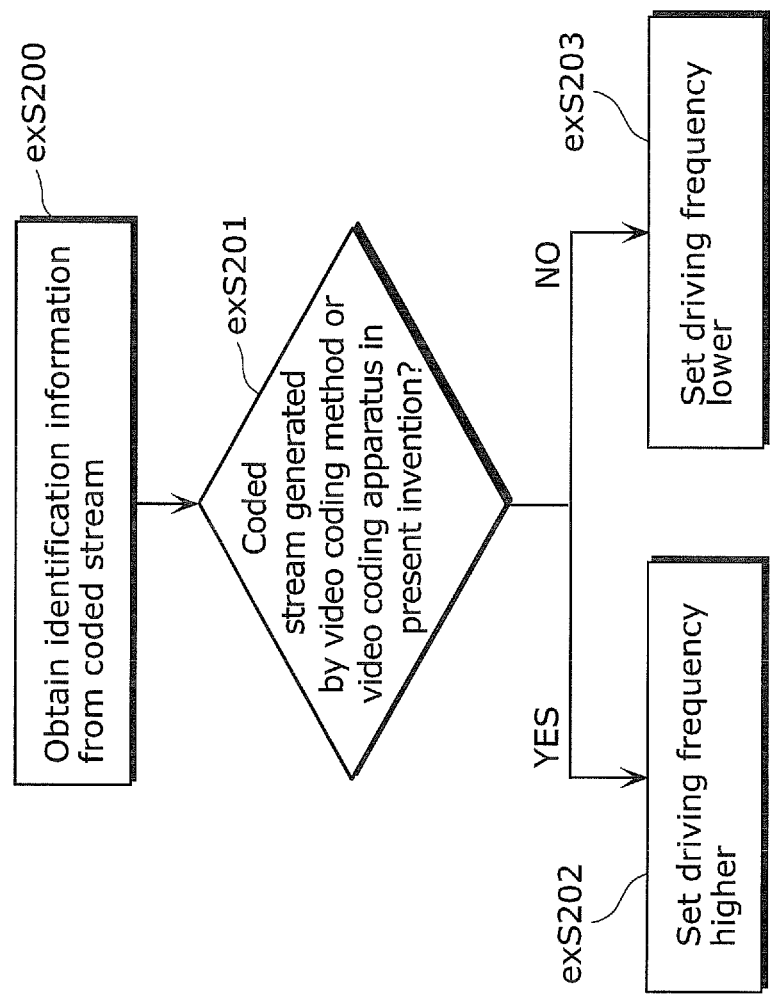
FIG. 33 is a drawing showing steps for identifying video data and switching between driving frequencies.

FIG. 33 illustrates steps for executing a method in Embodiment 11. First, in Step exS200, the signal processing unit ex507 obtains identification information from the multiplexed data. Next, in Step exS201, the CPU ex502 determines whether or not the video data is generated based on the identification information by the coding method and the coding apparatus described in each of Embodiments. When the video data is generated by the video coding method and the video coding apparatus described in each of Embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG4-AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the video coding method and the video coding apparatus described in each of Embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG4-AVC is larger than the processing amount for decoding video data generated by the video coding method and the video coding apparatus described in each of Embodiments, the driving frequency is probably set in reverse order to the setting described above. Furthermore, the method for setting the driving frequency is not limited to the method for setting the driving frequency lower. For example, when the identification information indicates that the video data is generated by the video coding method and the video coding apparatus described in each of Embodiments, the voltage to be applied to the LSI ex500 or the apparatus including the LSI ex500 is probably set higher. When the identification information indicates that the video data conforms to the conventional standard, such as MPEG-2, MPEG4-AVC, and VC-1, the voltage to be applied to the LSI ex500 or the apparatus including the LSI ex500 is probably set lower. As another example, when the identification information indicates that the video data is generated by the video coding method and the video coding apparatus described in each of Embodiments, the driving of the CPU ex502 does not probably have to be suspended. When the identification information indicates that the video data conforms to the conventional standard, such as MPEG-2, MPEG4-AVC, and VC-1, the driving of the CPU ex502 is probably suspended at a given time because the CPU ex502 has extra processing capacity. Even when the identification information indicates that the video data is generated by the video coding method and the video coding apparatus described in each of Embodiments, in the case where the CPU ex502 may have a time delay, the driving of the CPU ex502 is probably suspended at a given time. In such a case, the suspending time is probably set shorter than that in the case where when the identification information indicates that the video data conforms to the conventional standard, such as MPEG-2, MPEG4-AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

(Embodiment 6)

There are cases where a plurality of video data that conforms to a different standard, is provided to the devices and systems, such as a television and a mobile phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the video decoding method described in each of Embodiments and the decoding processing unit that conforms to the conventional standard, such as MPEG-2, MPEG4-AVC, and VC-1 are partly shared. Furthermore, ex900 in FIG. 35A shows another example in that processing is partly shared.

For example, the video decoding method described in each of Embodiments and the video decoding method that conforms to MPEG4-AVC have, partly in common, the details of processing, such as entropy coding, inverse quantization, deblocking filtering, and motion compensated prediction. The details of processing to be shared probably includes use of a decoding processing unit ex902 that conforms to MPEG4-AVC. In contrast, a dedicated decoding processing unit ex901 is probably used for other processing unique to the present invention. The decoding processing unit for implementing the video decoding method described in each of Embodiments may be shared for the processing to be shared, and a dedicated decoding processing unit may be used for processing unique to that of MPEG4-AVC.

Furthermore, ex1000 in FIG. 35B shows another example in that processing is partly shared. This example uses a configuration including a dedicated decoding processing unit ex1001 that supports the processing unique to the present invention, a dedicated decoding processing unit ex1002 that supports the processing unique to another conventional standard, and a decoding processing unit ex1003 that supports processing to be shared between the video decoding method in the present invention and the conventional video decoding method. Here, the dedicated decoding processing units ex1001 and ex1002 are not necessarily specialized for the processing of the present invention and the processing of the conventional standard, respectively, and may be the ones capable of implementing general processing. Furthermore, the configuration of Embodiment 12 can be implemented by the LSI ex500.

As such, reducing the scale of the circuit of an LSI and reducing the cost are possible by sharing the decoding processing unit for the processing to be shared between the video decoding method in the present invention and the video decoding method in conformity with the conventional standard.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The image coding method and the image decoding method according to the present invention have an advantageous effect of reducing the processing loads and can be applied, for example, to a video camera, a cellular phone having the functions of capturing and reproducing of video, a personal computer, a recording and reproducing apparatus, and so on.

What is claimed is:

1. An image coding method for coding a video signal using a processor, said image coding method comprising:
    classifying a plurality of images included in the video signal into layers, each of the plurality of images belonging to a corresponding one of the layers;
    generating a flag to be embedded in the video signal, the flag indicating whether a third image is prohibited to refer to a second image or not, where the third image belongs to a layer equal to or higher layer than a layer to which the second image belongs, the second image precedes a first image in coding order, and the third image follows the first image and the second image in coding order;
    coding the first image and the second image; and
    coding the third image, where the third image is coded without referring to the second image when the flag indicates that the third image is prohibited to refer to the second image and the third image is able to be coded by referring to the second image when the flag indicates that the third image is not prohibited to refer to the second image.

2. An image coding apparatus which codes a video signal, said image coding apparatus comprising:
    a processor; and
    a non-transitory memory having stored thereon executable instructions, which when executed, cause the processor to perform:

classifying a plurality of images included in the video signal into layers, each of the plurality of images belonging to a corresponding one of the layers;

generating a flag to be embedded in the video signal, the flag indicating whether a third image is prohibited to refer to a second image or not, where the third image belongs to a layer equal to or higher layer than a layer to which the second image belongs, the second image precedes a first image in coding order, and the third image follows the first image and the second image in coding order;

coding the first image and the second image; and coding the third image, where the third image is coded without referring to the second image when the flag indicates that the third image is prohibited to refer to the second image and the third image is able to be coded by referring to the second image when the flag indicates that the third image is not prohibited to refer to the second image.

3. An image decoding method for decoding a video signal using a processor, said image decoding method comprising:

classifying a plurality of images included in the video signal into layers, each of the plurality of images belonging to a corresponding one of the layers;

obtaining a flag from the video signal, the flag indicating whether a third image is prohibited to refer to a second image or not, where the third image belongs to a layer equal to or higher layer than a layer to which the second image belongs, the second image precedes a first image in decoding order, and the third image follows the first image and the second image in decoding order;

decoding the first image and the second image; and decoding the third image, where the third image is decoded without referring to the second image when the flag indicates that the third image is prohibited to refer to the second image and the third image is able to be decoded by referring to the second image when the flag indicates that the third image is not prohibited to refer to the second image.

4. An image decoding apparatus which decodes a video signal, said image decoding apparatus comprising:

a processor; and a non-transitory memory having stored thereon executable instructions, which when executed, cause the processor to perform:

classifying a plurality of images included in the video signal into layers, each of the plurality of images belonging to a corresponding one of the layers;

obtaining a flag to be embedded in the video signal, the flag indicating whether a third image is prohibited to refer to a second image or not, where the third image belongs to a layer equal to or higher layer than a layer to which the second image belongs, the second image precedes a first image in decoding order, and the third image follows the first image and the second image in decoding order;

decoding the first image and the second image; and decoding the third image, where the third image is decoded without referring to the second image when the flag indicates that the third image is prohibited to refer to the second image and the third image is able to be decoded by referring to the second image when the flag indicates that the third image is not prohibited to refer to the second image.

* * * * *